US010323660B2

(12) United States Patent
Ishibashi et al.

(10) Patent No.: US 10,323,660 B2
(45) Date of Patent: Jun. 18, 2019

(54) CYLINDER GUIDE MECHANISM AND CYLINDER WITH GUIDE MECHANISM

(71) Applicant: SMC CORPORATION, Chiyoda-ku (JP)

(72) Inventors: Koichiro Ishibashi, Tsukubamirai (JP); Motohiro Sato, Toride (JP); Nariaki Suzuki, Kita (JP); Hidefumi Ikeda, Tsukubamirai (JP); Toshio Sato, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 223 days.

(21) Appl. No.: 15/322,658

(22) PCT Filed: Jun. 23, 2015

(86) PCT No.: PCT/JP2015/068031
§ 371 (c)(1),
(2) Date: Dec. 28, 2016

(87) PCT Pub. No.: WO2016/006437
PCT Pub. Date: Jan. 14, 2016

(65) Prior Publication Data
US 2017/0146038 A1    May 25, 2017

(30) Foreign Application Priority Data
Jul. 9, 2014    (JP) .................................. 2014-141624

(51) Int. Cl.
*F15B 15/14* (2006.01)
*F16C 29/04* (2006.01)
*F16C 29/00* (2006.01)

(52) U.S. Cl.
CPC ........ *F15B 15/1471* (2013.01); *F16C 29/004* (2013.01); *F16C 29/04* (2013.01); *F16C 2361/00* (2013.01)

(58) Field of Classification Search
CPC ... F15B 15/1471; F16C 29/004; F16C 29/046
See application file for complete search history.

(56) References Cited

U.S. PATENT DOCUMENTS 6,336,390 B1 * 1/2002 Sato .................... F15B 15/1404
91/406
6,756,707 B2 * 6/2004 Hochhalter ............. F16H 25/20
310/20

(Continued)

FOREIGN PATENT DOCUMENTS

| CN | 101191508 A | 6/2008 |
| JP | 9-303318 A | 11/1997 |
| JP | 2006-105391 A | 4/2006 |

OTHER PUBLICATIONS

International Search Report dated Oct. 6, 2015, in PCT/JP2015/068031 filed Jun. 23, 2015.

(Continued)

*Primary Examiner* — Michael Leslie
*Assistant Examiner* — Matthew Wiblin
(74) *Attorney, Agent, or Firm* — Oblon, McClelland, Maier & Neustadt, L.L.P.

(57) ABSTRACT

A cylinder guide mechanism includes a floating bush, a holding part that holds the floating bush, and a linear guide. When a working fluid is supplied in a tube and a piston rod moves back and forth, the floating bush and a guide member of the linear guide move back and forth in the same direction. At this time, a slider of the linear guide is displaced relative to the guide member by retaining the same position. The slider is connected to the tube via an L-bracket.

16 Claims, 18 Drawing Sheets

(56) References Cited

U.S. PATENT DOCUMENTS

| | | | | |
|---|---|---|---|---|
| 7,191,695 | B2* | 3/2007 | Sato | F15B 15/226 |
| | | | | 92/13.7 |
| 7,806,041 | B2* | 10/2010 | Someya | F15B 15/082 |
| | | | | 92/146 |
| 2004/0252922 | A1* | 12/2004 | McIntosh | F15B 15/1471 |
| | | | | 384/42 |
| 2006/0054438 | A1 | 3/2006 | Asaba et al. | |
| 2017/0058950 | A1* | 3/2017 | Yoshida | F16C 29/04 |

OTHER PUBLICATIONS

Combined Chinese Office Action and Search Report dated Nov. 16, 2017, in Patent Application No. 201580037114.6 (with English translation).

* cited by examiner

CYLINDER GUIDE MECHANISM AND CYLINDER WITH GUIDE MECHANISM

TECHNICAL FIELD

The present invention relates to a cylinder guide mechanism for guiding a piston rod of a cylinder when the piston rod performs advancing and retracting operations relatively with respect to a tube, as well as to a guide mechanism equipped cylinder to which the guide mechanism is attached.

BACKGROUND ART

As is well known, a cylinder includes therein a piston that undergoes sliding movement in a piston slide hole that is formed in a tube, and a piston rod connected to the piston and which is displaced integrally with the piston upon the piston making advancing and retracting movements. In this type of cylinder, for example, a predetermined workpiece is attached to the piston rod. In this case, the workpiece undergoes movement accompanying displacement of the piston rod. In other words, the cylinder functions as a transport means for transporting the workpiece.

Incidentally, in such a cylinder, due to dimensional variations, a gap tends to develop between both members of the piston and the piston slide hole. Therefore, when a load (hereinafter referred to as a "lateral load") in a direction perpendicular to the axial direction is applied with respect to a distal end of the piston rod that is exposed from the piston slide hole, another end part of the piston rod on a side thereof that is inserted into the piston slide hole is displaced in a direction opposite to the direction of the lateral load. More specifically, when the piston rod and the piston are displaced, they tend to become inclined easily, and it is likely for looseness or so-called rattling of the piston rod to occur.

Thus, it has widely been practiced to provide a guide mechanism in order to prevent such looseness or rattling of the piston rod. For example, as shown in FIG. 1 of Japanese Laid-Open Patent Publication No. 2006-105391, in a guide mechanism equipped cylinder, one piston slide hole, and two guide holes sandwiching the piston slide hole therebetween are formed in a tube. A piston rod that is inserted into the piston slide hole, and guide rods that are inserted into the respective guide holes are connected respectively to a connecting plate. Therefore, the guide rods and the plate also undergo displacement in following relation to the advancing and retracting operations of the piston rod.

In this configuration, since the piston rod is connected to the guide rods through the connecting plate, it is unlikely for rattling to occur even if lateral loads are applied. Further, since it is remarkably difficult for the piston rod to undergo rotation, non-rotational precision also is enhanced.

As shown in FIG. 3 of Japanese Laid-Open Patent Publication No. 09-303318, in the same manner as in Japanese Laid-Open Patent Publication No. 2006-105391, a guide mechanism equipped cylinder is disclosed, which includes one piston rod, and two guide rods that are arranged so as to sandwich the piston rod therebetween.

SUMMARY OF INVENTION

As discussed above, the guide mechanism equipped cylinders disclosed in Japanese Laid-Open Patent Publication No. 2006-105391 and Japanese Laid-Open Patent Publication No. 09-303318 are devices in which guide holes are formed in the tube, and the piston rod and the guide rods that are inserted into the guide holes are connected to a connecting plate. More specifically, the cylinder mechanism and the guide mechanism both share a single tube and are disposed integrally therewith.

Incidentally, for example, depending on the environment of use, cases occur in which it is desirable to additionally attach a guide mechanism with respect to a preexisting cylinder as a retail commercial product. However, when attaching the guide mechanisms of the conventional art to such a cylinder, a drilling process must be carried out for forming the guide holes in the tube. Consequently, it is complicated to additionally attach the guide mechanisms of the conventional art with respect to cylinders that are available as retail commercial products.

A principal object of the present invention is to provide a cylinder guide mechanism, which is capable of being constructed separately from a cylinder, and is easily attached with respect to such a preexisting cylinder.

Another object of the present invention is to provide a cylinder guide mechanism that does not require any machining to be performed when attaching the cylinder guide mechanism.

Another further object of the present invention is to provide a guide mechanism equipped cylinder, which is constructed by attaching the aforementioned cylinder guide mechanism to a cylinder.

According to an embodiment of the present invention, a cylinder guide mechanism is provided, which is attached to a cylinder in which a piston rod performs relative advancing and retracting operations with respect to a tube, the cylinder guide mechanism comprising:

a floating bush configured to undergo advancing and retracting operations in following relation to the advancing and retracting operations of the piston rod;

a holding part configured to retain the floating bush;

a guide mechanism including a guide member retained by the holding part, and a displaceable member supported on the guide member and configured to be displaced relatively with respect to the guide member; and a bracket configured to connect the displaceable member and the tube.

When a guide mechanism equipped cylinder is constructed by attaching the cylinder guide mechanism to a cylinder, operations may be performed to attach the floating bush to the piston rod, and to connect the displaceable member to the tube through the bracket. More specifically, assembly of the cylinder guide mechanism is possible without performing a drilling process for forming guide holes with respect to a preexisting cylinder as a retail commercial product, and without requiring any other type of machining to be performed. In other words, production of a so-called retrofitted device is facilitated.

Further, as noted above, the operation to assemble the cylinder guide mechanism on the cylinder is simple. Stated otherwise, the cylinder guide mechanism is easily attached with respect to the cylinder.

Furthermore, assuming that the floating bush can be attached to the piston rod and the bracket can be connected to the tube, the cylinder guide mechanism is capable of being attached at any arbitrary location of the cylinder. Consequently, by suitably setting the attachment location (and direction) of the guide mechanism, for example, it is possible to avoid interference of the guide mechanism with a predetermined attachment member to which the guide mechanism equipped cylinder is attached. In this manner, in accordance with the above-described configuration, an advantage is obtained in that the degree of freedom in choosing the assembly location is enhanced.

The holding part may be constituted by a retaining member that retains the floating bush, and a workpiece transporting member that is supported by the guide member together with holding the retaining member. In this case, a bush insertion hole in which the floating bush is inserted is formed in the workpiece transporting member, and a certain amount of play is formed between an inner wall of the bush insertion hole and a side wall of the floating bush.

In such a configuration, a first engagement part may be formed on the floating bush, and a second engagement part that engages with the first engagement part may be formed on the retaining member. At this time, a certain amount of play is formed between the first engagement part and the second engagement part.

Inevitable tolerances are produced within the floating bush, the retaining member, and the workpiece transporting member. For this reason, for example, the center (axial center) of the bush insertion hole does not coincide with the center (axial center) of the piston rod, and so-called axial center misalignment occurs. In such a case, if no play is formed between the inner wall of the bush insertion hole and the side wall of the floating bush, then since axial center misalignment occurs between the piston rod and the floating bush, the floating bush cannot easily be attached to the piston rod.

In contrast thereto, when play is provided in the manner described above, the floating bush is capable of relative displacement inside the bush insertion hole within the range of play provided. Stated otherwise, the floating bush is supported in a so-called floating manner. Therefore, since axial center misalignment is absorbed, the floating bush can easily be attached to the piston rod.

The first engagement part can be formed as a circumferential groove around the side wall of the floating bush. In this case, the second engagement part may be an insert portion that is inserted into the circumferential groove.

Moreover, as a preferable example for the bracket, there may be offered an elbow-shaped member in which two flat sections are joined via a bent section. As a more detailed example, an L-shaped bracket having a substantial L-shape is provided. In this case, one of the flat sections may abut against an end surface of the tube on which the piston rod is exposed, or may abut against a rear surface on an opposite side from the end surface, and a remaining one of the flat sections may be connected to the displaceable member.

In particular, the one flat section preferably abuts against the aforementioned rear surface. In this case, only the cylinder itself can easily be separated away from the cylinder guide mechanism, without removing the cylinder guide mechanism from the predetermined attachment member to which the cylinder guide mechanism is attached.

For attaching the guide mechanism equipped cylinder, in which the cylinder guide mechanism is attached to the cylinder, to the attachment member, for example, the bracket may be positioned and fixed in place by a connecting member. For this purpose, a connecting member passage hole for passage therethrough of a connecting member is formed in the holding part. Further, the connecting member passage hole has a larger diameter than a connecting member itself and a connecting member insertion hole that is formed in the tube.

In this case, even though the holding part is positioned so as to cover the piston rod and the tube, the connecting member can be inserted and passed from the connecting member passage hole of the holding part. This is because, as noted above, the connecting member passage hole is larger in diameter than the connecting member. In addition, the connecting member that has been passed through the connecting member passage hole passes through the connecting member insertion hole of the tube and the insertion hole of the bracket, and furthermore, is inserted into a predetermined insertion recess of the attachment member. Consequently, simultaneously with the guide mechanism being assembled onto the cylinder, the guide mechanism equipped cylinder is positioned and fixed to the attachment member.

In the foregoing manner, according to such a configuration and by means of a simple operation, it is possible for the cylinder guide mechanism to be assembled onto the cylinder, while simultaneously, the guide mechanism equipped cylinder can be attached to the attachment member.

In the connecting member passage hole, there may further be included a positioning member inserted therein and configured to position a workpiece. In accordance with this feature, a workpiece can easily be positioned on the workpiece transporting member. Thus, the workpiece is easily attached to the workpiece transporting member, and conveying of the workpiece is facilitated.

In the case that transporting of the workpiece is carried out by the guide mechanism equipped cylinder, a workpiece supporting hole may be formed in the holding part. By supporting the workpiece on the holding part using the workpiece supporting hole, it is possible for the workpiece to be transported accompanying advancing and retracting movements of the piston rod and the floating bush.

Further, according to another embodiment of the present invention, a guide mechanism equipped cylinder is provided, to which there is attached the cylinder guide mechanism having any of the above-described configurations. More specifically, in accordance with such a guide mechanism equipped cylinder, the aforementioned advantages and effects based on the above-described cylinder guide mechanism are obtained.

DESCRIPTION OF EMBODIMENTS

Below, a detailed description will be presented with reference to the accompanying drawings of preferred embodiments in relation to a cylinder guide mechanism according to the present invention, as well as a guide mechanism equipped cylinder to which the cylinder guide mechanism is attached. In the following description, the cylinder guide mechanism may also be referred to simply as a "guide mechanism".

Figure 1:
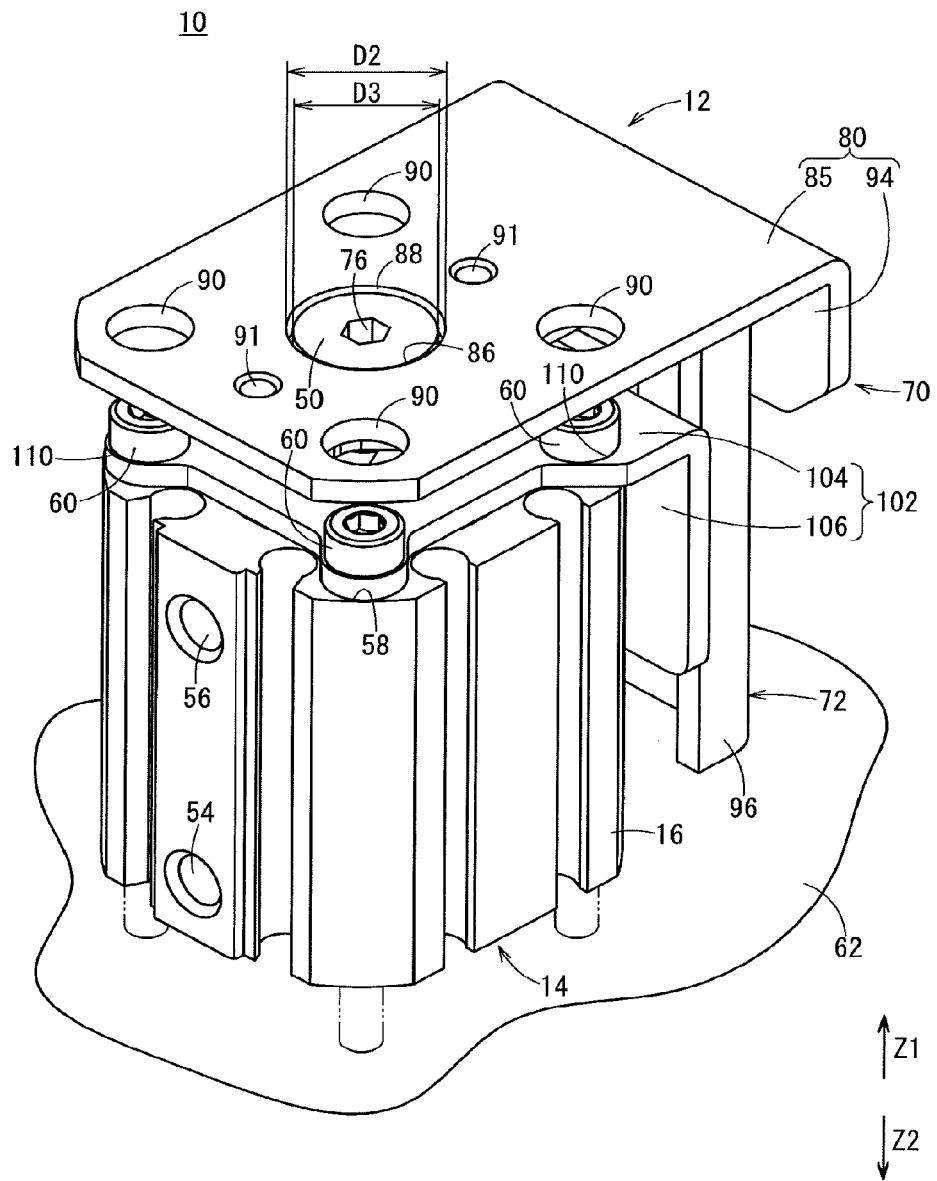
FIG. 1 is an overall schematic perspective view of a guide mechanism equipped cylinder according to a first embodiment of the present invention.
Figure 2:
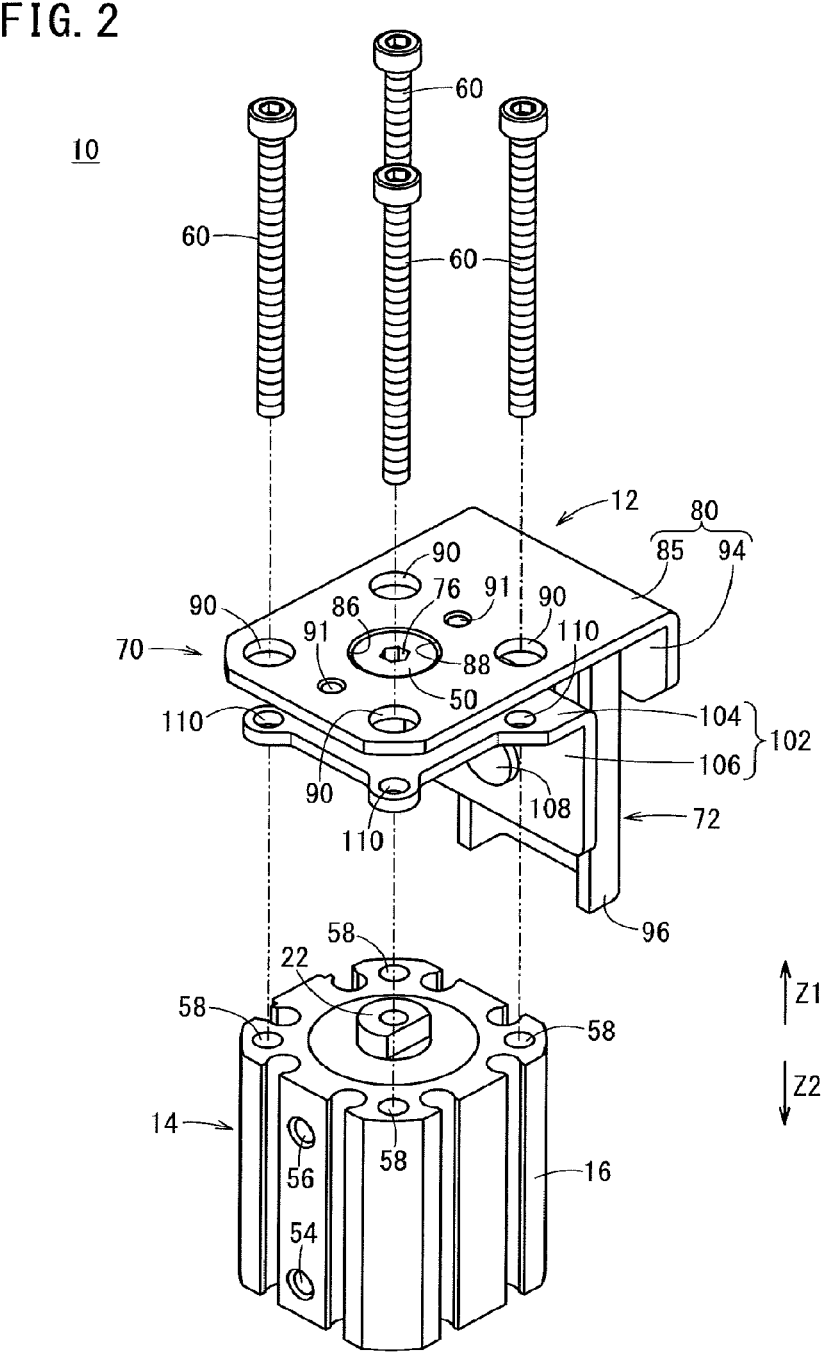
FIG. 2 is a schematic exploded perspective view of the guide mechanism equipped cylinder according to the first embodiment.
Figure 3:
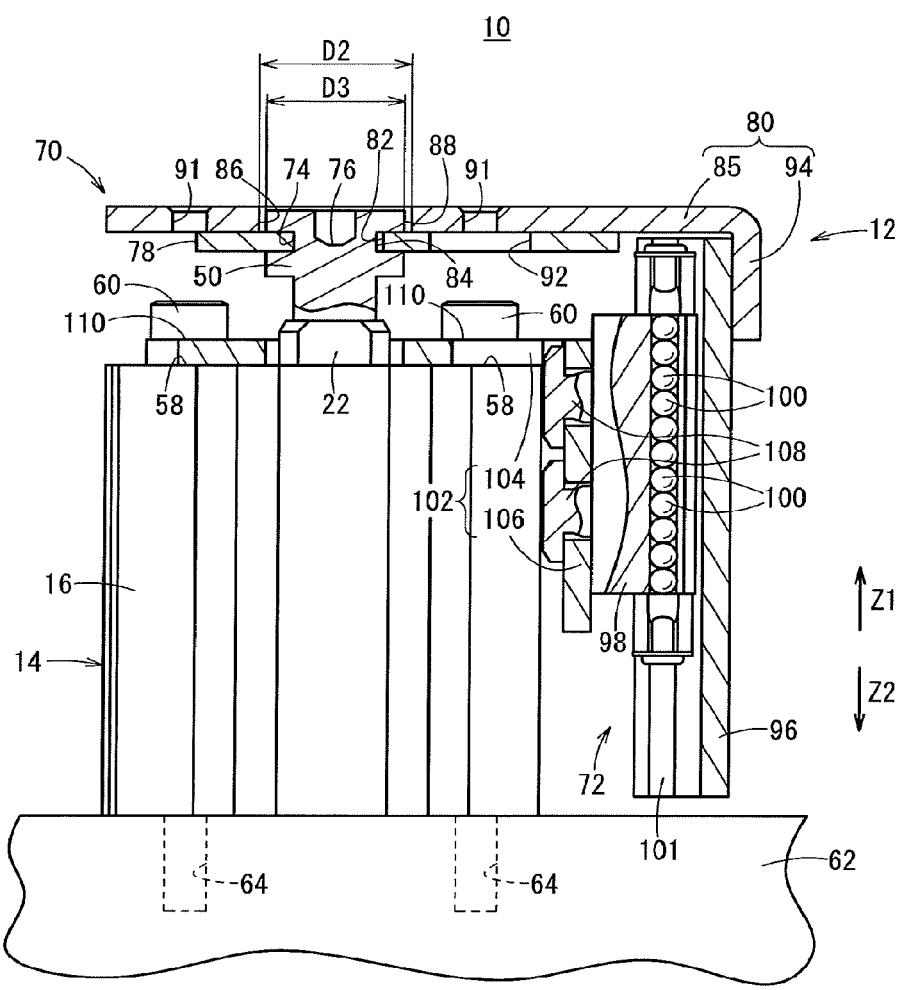
FIG. 3 is an overall schematic side view of the guide mechanism equipped cylinder according to the first embodiment.
Figure 4:
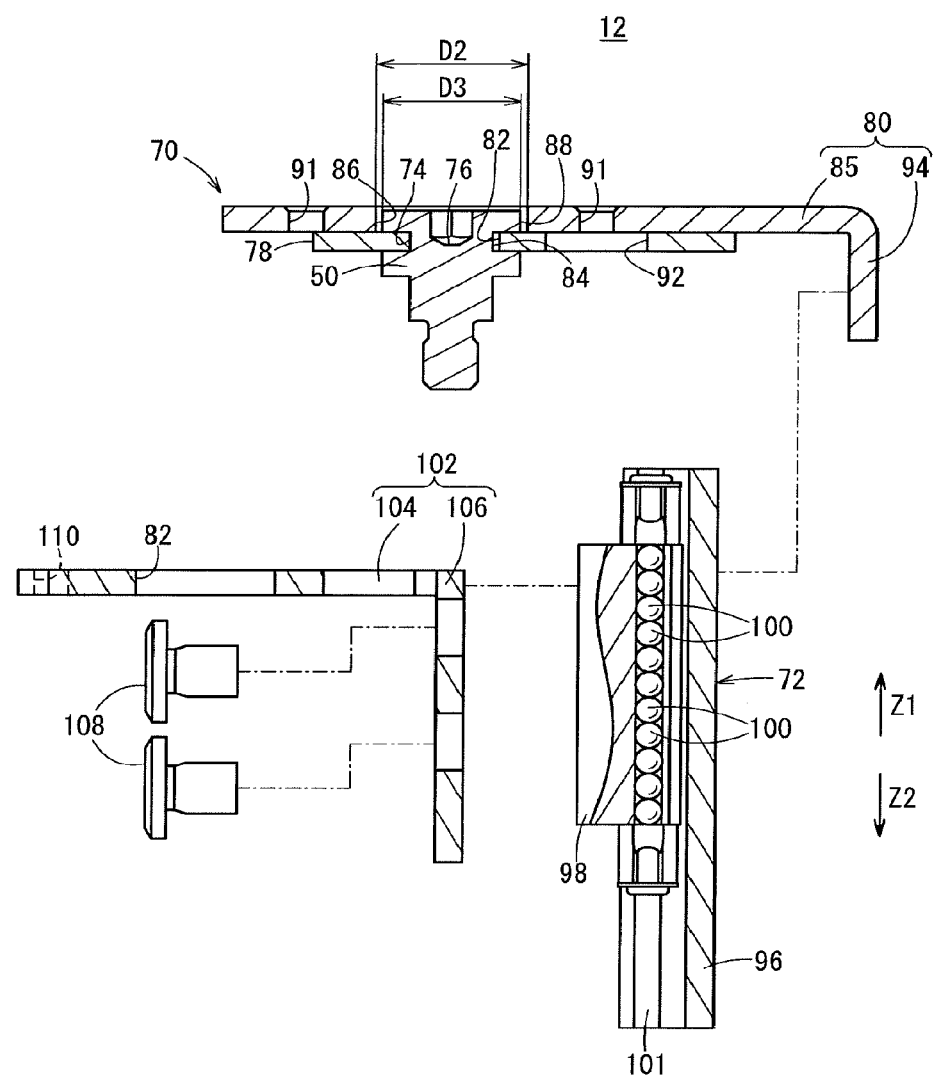
FIG. 4 is a schematic exploded side view of the guide mechanism equipped cylinder according to the first embodiment.

FIGS. 1 through 3, respectively, are an overall schematic perspective view, a schematic exploded perspective view, and an overall schematic side view of a guide mechanism equipped cylinder 10 according to a first embodiment, and FIG. 4 is a schematic exploded side view of a guide mechanism 12. The guide mechanism equipped cylinder 10 is constituted by attaching the guide mechanism 12 with respect to a cylinder 14.

Figure 5:
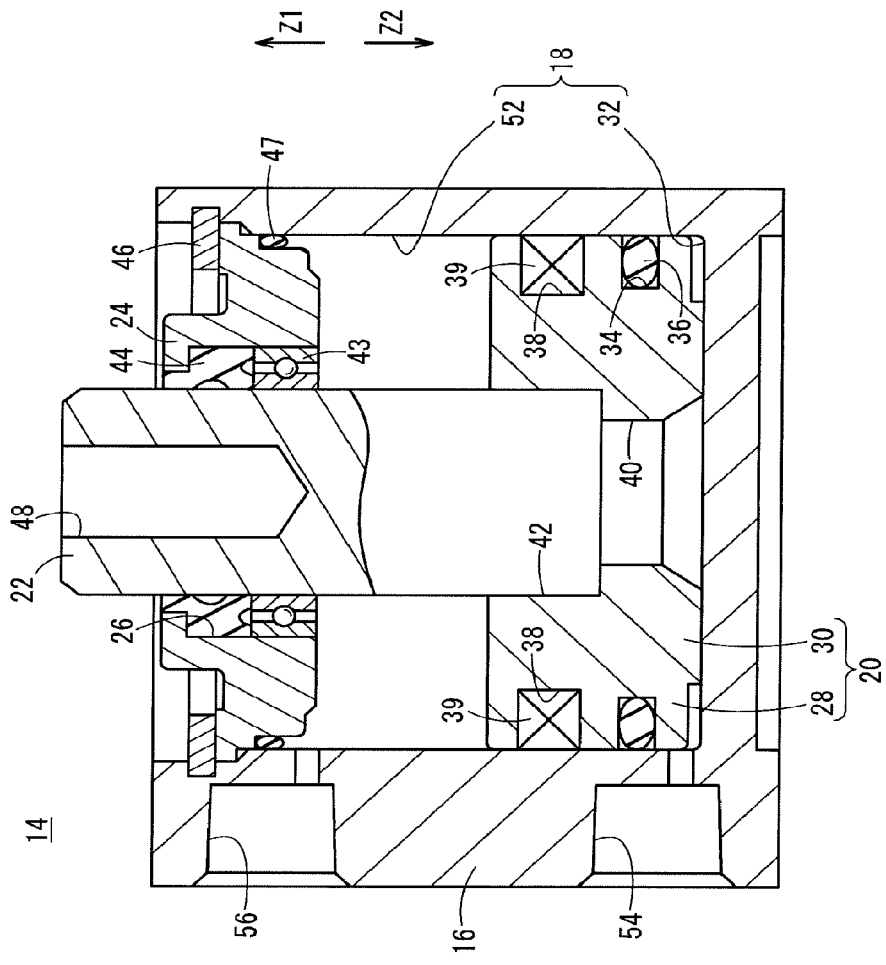
FIG. 5 is a schematic cross-sectional side view of the guide mechanism equipped cylinder according to the first embodiment.

To initially describe the cylinder 14, as shown in FIG. 5, such a cylinder 14 includes a tube 16, a piston 20 that is inserted into a piston slide hole 18 formed in the tube 16, and a piston rod 22 that is connected to the piston 20. An opening of the piston slide hole 18 is closed by a collar 24, and a distal end of the piston rod 22 is exposed to the exterior of the tube 16 through a through hole 26 that is formed substantially in the center of the collar 24. Hereinafter, the side on which the piston rod 22 is exposed will be referred to as an upper side, and the side opposite therefrom will be referred to as a lower side. More specifically, in the tube 16, for example, an end part or an end surface that is covered by the collar 24, together with being a side on which the distal end of the piston rod 22 is exposed, defines an upper end part or an upper end surface, whereas a closed surface that forms a rear surface on a side opposite from the upper end surface defines a lower end surface.

The piston 20 includes a disk portion 28 of a substantially equivalent diameter, and a cylindrical projecting portion 30 that is smaller in diameter and projects out from a lower end surface of the disk portion 28. When the piston 20 is at a bottom dead center point, the lower end surface of the cylindrical projecting portion 30 is seated on a lower end surface inner wall of the tube 16. At this time, a slight clearance (first chamber 32) is formed between the lower end surface inner wall of the tube 16 and the lower end surface of the disk portion 28.

On a side wall of the piston 20, an annular recess 34, which is recessed diametrally inward so as to circle around the side wall is formed in the vicinity of the lower end surface of the disk portion 28. An annular piston packing 36 that forms a seal between the side wall of the piston 20 and the inner wall of the tube 16 is installed in the annular recess 34. Further, in the vicinity of the upper end surface of the disk portion 28, a plurality of accommodating holes 38, which are recessed diametrally inward, are formed. Permanent magnets 39 are accommodated respectively in the accommodating holes 38.

A bolt insertion hole 40, and a rod insertion hole 42 contiguous to the bolt insertion hole 40 are formed substantially in the center of the piston 20. The bolt insertion hole 40 and the rod insertion hole 42 extend along a thickness direction of the piston 20. The bolt insertion hole 40 is formed up to a substantial mid-body portion in the thickness direction from the lower end surface of the piston 20, and the rod insertion hole 42 is formed from the substantial mid-body portion in the thickness direction until reaching the upper end surface of the piston 20.

A lower end part of the piston rod 22 is inserted into the rod insertion hole 42. A bolt hole, not shown, is formed in the lower end part of the piston rod 22. By insertion of a non-illustrated bolt through the bolt insertion hole 40 and screw-engagement thereof into the bolt hole, the piston rod 22 and the piston 20 are connected together mutually.

As noted above, the upper end part of the piston rod 22 passes through the through hole 26 of the collar 24. A bush 43 and a rod packing 44 are interposed between an inner wall of the through hole 26 and a side wall of the piston rod 22. The piston rod 22 is displaced while sliding with respect to the bush 43 and the rod packing 44. Moreover, the collar 24 is latched in engagement with the tube 16 through an annular locking member 46, and thereby, the collar 24 is positioned and fixed at a position to close the opening of the piston slide hole 18. A gasket 47, which seals a gap between the side wall of the collar 24 and the inner wall of the piston slide hole 18, is mounted on the side wall of the collar 24.

A bottomed connecting hole 48 is formed in the upper end part of the piston rod 22. Screw threads, not shown, are formed on an inner circumferential wall of the connecting hole 48. A lower end part of a floating bush 50 (see FIGS. 1 through 4) that constitutes part of the guide mechanism 12 is screw-engaged with the screw threads.

The piston slide hole 18 is partitioned into a first chamber 32 and a second chamber 52 with the disk portion 28 of the piston 20 forming a boundary therebetween. More specifically, the first chamber 32 is formed between a lower end surface inner wall of the tube 16 and the lower end surface of the disk portion 28, and the second chamber 52 is formed between the upper end surface of the disk portion 28 and a lower end surface of the collar 24. Movement of a working fluid from the first chamber 32 to the second chamber 52 or in a direction opposite thereto is prevented by the piston packing 36. Further, movement of the working fluid from the second chamber 52 to the atmosphere or in a direction opposite thereto is prevented by the rod packing 44.

A first port 54 that communicates with the first chamber 32, and a second port 56 that communicates with the second chamber 52 are formed in the tube 16. A working fluid (e.g., air) is supplied to the first chamber 32 and the second chamber 52, or the working fluid is discharged from the first chamber 32 and the second chamber 52 through the first port 54 and the second port 56.

As shown in FIGS. 1 through 3, four tie rod insertion holes 58 (connecting member insertion holes) are formed in a penetrating manner in the tube 16 along a thickness direction (i.e., a longitudinal direction from the lower end part to the upper end part) thereof. Elongate tie rods 60 that serve as connecting members are inserted through the respective tie rod insertion holes 58. The respective tie rods 60 are screw-engaged with threaded holes 64 (see FIG. 3) of a predetermined attachment member 62 (predetermined member) that is disposed on the lower end side of the tube 16, whereby the guide mechanism equipped cylinder 10 is positioned and fixed with respect to the attachment member 62. Along therewith, the tube 16 is connected to the attachment member 62.

Next, the guide mechanism 12 will be described. The guide mechanism 12 comprises the floating bush 50, a holding part 70 that retains the floating bush 50, and a linear guide 72 (guide mechanism) that is retained on the holding part 70.

As shown in FIG. 4, a lower end part of the floating bush 50 is formed as a small diameter threaded section. The threaded section is inserted into the connecting hole 48 that is formed in the upper end part of the piston rod 22, together with being screw-engaged with the screw threads that are formed on the inner circumferential wall of the connecting hole 48. Consequently, when the floating bush 50 is connected to the piston rod 22, the piston rod 22 and the floating bush 50 extend coaxially along the same axial line.

On a large diameter upper end part of the floating bush 50, an annular groove 74 (circumferential groove) is provided, which is recessed diametrically inward in a circling manner around the side wall. The annular groove 74 plays a role as a first engagement part for retaining the floating bush 50 on the holding part 70.

Furthermore, a bottomed screwing hole 76 for insertion therein of a driver or wrench is formed in a recessed manner on the upper end surface of the floating bush 50.

Figure 6:
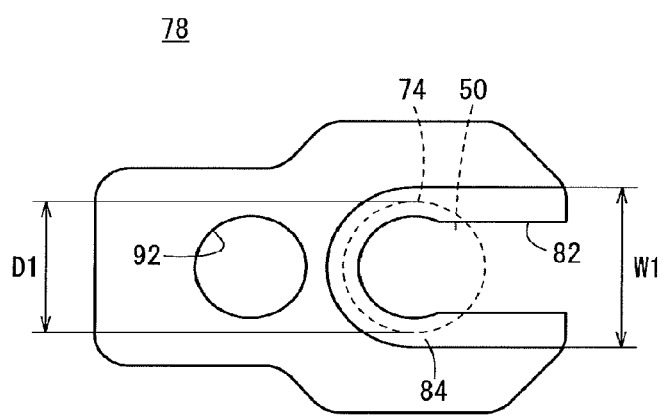
FIG. 6 is a schematic plan view of a retaining plate (retaining member) constituting part of the guide mechanism.

In this case, the holding part 70 includes a retaining plate (retaining member) 78, and an L-shaped plate 80 (workpiece transporting member) that holds the retaining plate 78. Among these features, the retaining plate 78 exhibits a substantial Y-shape as shown in FIG. 6, and therefore, a U-shaped groove 82 is formed in a distal end part thereof that is branched in a bifurcated manner. A region on an upper end part of the floating bush 50 in which the annular groove 74 is formed is inserted into the U-shaped groove 82.

A width dimension W1 of an opening of the U-shaped groove 82 is set to be smaller than a diameter of the upper end part of the floating bush 50. Therefore, a lower end surface side wall of the annular groove 74 of the floating bush 50 abuts against the retaining plate 78, and as a result, the floating bush 50 is locked therein. Consequently, the floating bush 50 is prevented from coming out from the U-shaped groove 82. More specifically, a region in the vicinity of the U-shaped groove 82 serves as an insertion portion (second engagement part) for engagement with the annular groove 74 by insertion thereof into the annular groove 74.

In this instance, the width dimension W1 of the U-shaped groove 82 is slightly larger than the diameter D1 of a region of the floating bush 50 that corresponds to the bottom wall of the annular groove 74. Therefore, a certain amount of play 84 of a predetermined interval is formed between the bottom wall of the annular groove 74 (first engagement part) and the inner wall of the U-shaped groove (second engagement part).

The retaining plate 78 is joined by welding, for example, to the L-shaped plate 80 (see FIGS. 1 through 3), and thereby is held on the L-shaped plate 80. As a result, the floating bush 50 is retained in the L-shaped plate 80 through the retaining plate 78. Moreover, in this case, the bifurcated distal end part of the retaining plate 78 is oriented toward the first port 54 and the second port 56, and together therewith, a plate-shaped rear end part thereof faces toward the linear guide 72.

On a flat ceiling wall portion 85 of the L-shaped plate 80, a bush insertion hole 86 (see FIGS. 1 and 2) is formed in a penetrating manner in the thickness direction. The upper end part of the floating bush 50 is inserted into the bush insertion hole 86. The upper end surface of the floating bush 50 and the upper end surface of the L-shaped plate 80 are substantially coplanar.

As shown in FIGS. 1 and 3, the diameter D2 of the bush insertion hole 86 is slightly larger than the diameter D3 of the upper end surface of the floating bush 50. Therefore, a certain amount of play 88 of the predetermined interval is formed between the inner wall of the bush insertion hole 86 and the side wall of the upper end surface of the floating bush 50.

As shown in FIGS. 1 and 2, four tie rod passage holes 90 (connecting member passage holes) through which the tie rods 60 are passed, and two workpiece supporting holes 91 are formed in a penetrating manner along the thickness direction in the ceiling wall portion 85. The four tie rod passage holes 90 are position at locations corresponding to the vertices of a square, and are formed in facing relation to the tie rod insertion holes 58 that are formed in the tube 16. On the other hand, the workpiece supporting holes 91 are formed in closer proximity to the bush insertion hole 86 than the rod passage holes 90, and at positions sandwiching the bush insertion hole 86 therebetween.

The workpiece supporting holes 91 are members that serve for the purpose of attaching a predetermined workpiece (not shown). More specifically, for example, in the event that threaded screw-engagement holes are formed in the workpiece, bolts may be inserted through the workpiece supporting holes 91 from the lower end surface side of the ceiling wall portion 85 of the L-shaped plate 80, and may be screw-engaged with the threaded screw-engagement holes. Moreover, as shown in FIG. 6, the retaining plate 78 is naturally of a shape and dimension that does not obstruct the workpiece supporting holes 91. Otherwise, through holes 92 that connect with the workpiece supporting holes 91 may be formed in the retaining plate 78.

Instead of supporting the workpiece with bolts, the workpiece may be supported by stepped pins that are inserted through the workpiece supporting holes 91.

A guide member 96, which is constituted by the linear guide 72 as a guide mechanism, for example, is welded with respect to a downwardly hanging wall portion 94 that is bent and hangs down from the ceiling wall portion 85 of the L-shaped plate 80. As a result, the linear guide 72 is retained on the holding part 70. In the foregoing manner, since the retaining plate 78 is held on the L-shaped plate 80, the retaining plate 78 also is supported indirectly on the guide member 96. More specifically, the holding part 70 is supported by the guide member 96.

In this case, the linear guide 72 is a so-called circulating ball type of linear guide. More specifically, a slider 98 that acts as a displaceable member is displaced relatively with respect to the guide member 96, as a result of plural balls 100 being circulated inside guide grooves 101 that are formed in the guide member 96. At this time, it is a matter of course that the slider 98 moves relatively along the guide grooves 101.

An L-shaped bracket 102 serving as a bracket is attached to the slider 98 and the tube 16. More specifically, the L-shaped bracket 102 includes a ceiling wall portion 104 (flat section), and a downwardly hanging wall portion 106 (flat section) that is substantially bent and hangs down from the ceiling wall portion 104. The L-shaped bracket 102 is an elbow-shaped member, in which an intersecting angle of the ceiling wall portion 104 and the downwardly hanging wall portion 106 forms an angle of roughly 90°. Stated otherwise, the ceiling wall portion 104 and the downwardly hanging wall portion 106 are joined through a bent section.

Among such members, the downwardly hanging wall portion 106 is attached to (supported on) the slider 98 by bolts 108. On the other hand, four tie rod blocking holes 110 are formed in the ceiling wall portion 104, and the tube 16 is attached to (supported on) the ceiling wall portion 104 by the tie rods 60, the heads of which are blocked in the respective tie rod blocking holes 110.

The guide mechanism equipped cylinder 10 according to the first embodiment is constructed basically as described above. Next, operations and advantages thereof will be described in relation to an attachment operation of the guide mechanism 12 onto the cylinder 14, and movement actions of the cylinder 14.

In order to attach the guide mechanism 12 with respect to the cylinder 14, together with attaching the guide mechanism equipped cylinder 10 on the predetermined attachment member 62 (see FIG. 3), at first, the threaded section of the floating bush 50 that makes up part of the previously assembled guide mechanism 12 is inserted into the connecting hole 48 of the piston rod 22. Thereafter, the floating bush 50 is rotated through a driver or wrench or the like, which is inserted into the screwing hole 76 of the floating bush 50. Accordingly, the threaded section of the floating bush 50 is screw-engaged with the screw threads of the connecting hole 48.

Next, the lower end surface of the tube 16 is placed in abutment at a predetermined location of the attachment member 62. At this time, the positions of the tie rod insertion holes 58 coincide with the positions of the threaded holes 64 that are formed in the attachment member 62. More specifically, the tie rod insertion holes 58 are placed contiguously to the threaded holes 64.

In such a state, the lower end surface of the ceiling wall portion 104 of the L-shaped bracket 102 of the guide mechanism 12 is placed in abutment against the upper end surface of the tube 16, so that the tie rod blocking holes 110 are made contiguous with the tie rod insertion holes 58 of the tube 16. Furthermore, threaded sections of the tie rods 60 are passed through the tie rod passage holes 90 of the L-shaped plate 80, the tie rod blocking holes 110, and the tie rod insertion holes 58 of the tube 16, and are screw-engaged in the threaded holes 64. The diameters of the head portions of the tie rods 60 are smaller than the diameters of the tie rod passage holes 90, and therefore, the tie rods 60 are easily allowed to pass through the tie rod passage holes 90.

Further, because the diameters of the head portions of the tie rods 60 are larger than the diameters of the tie rod blocking holes 110, the head portions of the tie rods 60 are blocked at positions in the vicinity of the openings of the tie rod blocking holes 110. Accordingly, the tie rods 60 connect the L-shaped bracket 102 to the tube 16, together with connecting the tube 16 to the attachment member 62. Owing to the above features, together with attachment of the guide mechanism 12 to the cylinder 14, the cylinder 14 is positioned and fixed on the attachment member 62.

In the foregoing manner, in accordance with the first embodiment, the floating bush 50 is attached (connected) with respect to the piston rod 22 in such a manner that the floating bush 50 extends substantially coaxially with respect to the piston rod 22, and the slider 98 is attached to the tube 16 through the L-shaped bracket 102. Therefore, production of a so-called retrofitted device, which is attached with respect to a preexisting cylinder 14, is facilitated.

Further, simultaneously with attachment of the guide mechanism 12 to the cylinder 14, the cylinder 14 is positioned and fixed on a predetermined attachment member 62. More specifically, the assembly operation of the guide mechanism equipped cylinder 10, and the attachment operation of attaching the guide mechanism equipped cylinder 10 to the attachment member 62 can be carried out efficiently. In addition, both of the assembly operation and the attachment operation are simple, and there is no particular need for machining to be performed in either case.

When the floating bush 50, the retaining plate 78, and the L-shaped plate 80 are manufactured, tolerances are inevitably produced in relation to the dimensions of the respective attachment members 62. Thus, in the first embodiment, the amount of play 84 is formed between the inner wall of the U-shaped groove 82 of the retaining plate 78 and the bottom wall of the annular groove 74 of the floating bush 50, and together therewith, the amount of play 88 is formed between the inner wall of the bush insertion hole 86 of the L-shaped plate 80 and the side wall of an upper end part of the floating bush 50.

If such amounts of play 84, 88 were not provided, then in the case that the central axes of the piston slide hole 18, the U-shaped groove 82, and the bush insertion hole 86 did not coincide strictly with each other, axial center misalignment would occur between the floating bush 50 and the piston rod 22. In such a case, insertion of the lower end part of the floating bush 50 into the connecting hole 48 of the piston rod 22, and screw-turning of the floating bush 50 cannot be performed easily.

In contrast thereto, according to the first embodiment, since the amounts of play 84, 88 are provided, the floating bush 50 can be displaced relatively with respect to the holding part 70 within the range of play, i.e., the amounts of play 84, 88 that are provided. More specifically, while the floating bush 50 is maintained in a state of being held by the retaining plate 78 and hence by the holding part 70, the floating bush 50 is capable of being connected to the piston rod 22 in such a manner that the central axis thereof coincides with the central axis of the piston rod 22.

In the forgoing manner, by providing the amounts of play 84, 88, if axial center misalignment occurs between the piston slide hole 18, the U-shaped groove 82, and the bush insertion hole 86, such axial center misalignment is absorbed, and the floating bush 50 can be attached to the piston rod 22.

Furthermore, a workpiece, not shown, is attached to the L-shaped plate 80 through bolts or the like that are passed through the workpiece supporting holes 91. Consequently, the workpiece is supported on the guide mechanism equipped cylinder 10.

The guide mechanism equipped cylinder 10 is operated in the following manner. More specifically, when the piston rod 22 and the floating bush 50 are at their bottom dead center positions, a working fluid (e.g., air) is supplied to the first chamber 32 from the first port 54 shown in FIG. 5. The piston 20 receives a pressing force of the working fluid that is supplied to the first chamber 32. As a result, the piston 20 and the piston rod 22 rise upwardly. At this time, the working fluid accommodated in the second chamber 52 is discharged out from the second port 56.

Accompanying the rise of the piston rod 22, the floating bush 50 also rises. Since the floating bush 50 is held on the retaining plate 78, and the L-shaped plate 80 that holds the retaining plate 78 also is retained by the guide member 96 as well, the holding part 70 and the guide member 96 rise in following relation with rising of the floating bush 50. At this time, since the balls 100 are circulated inside the guide grooves 101, the slider 98 is kept in its original position. Consequently, the slider 98 descends relatively with respect to the guide member 96.

Figure 7:
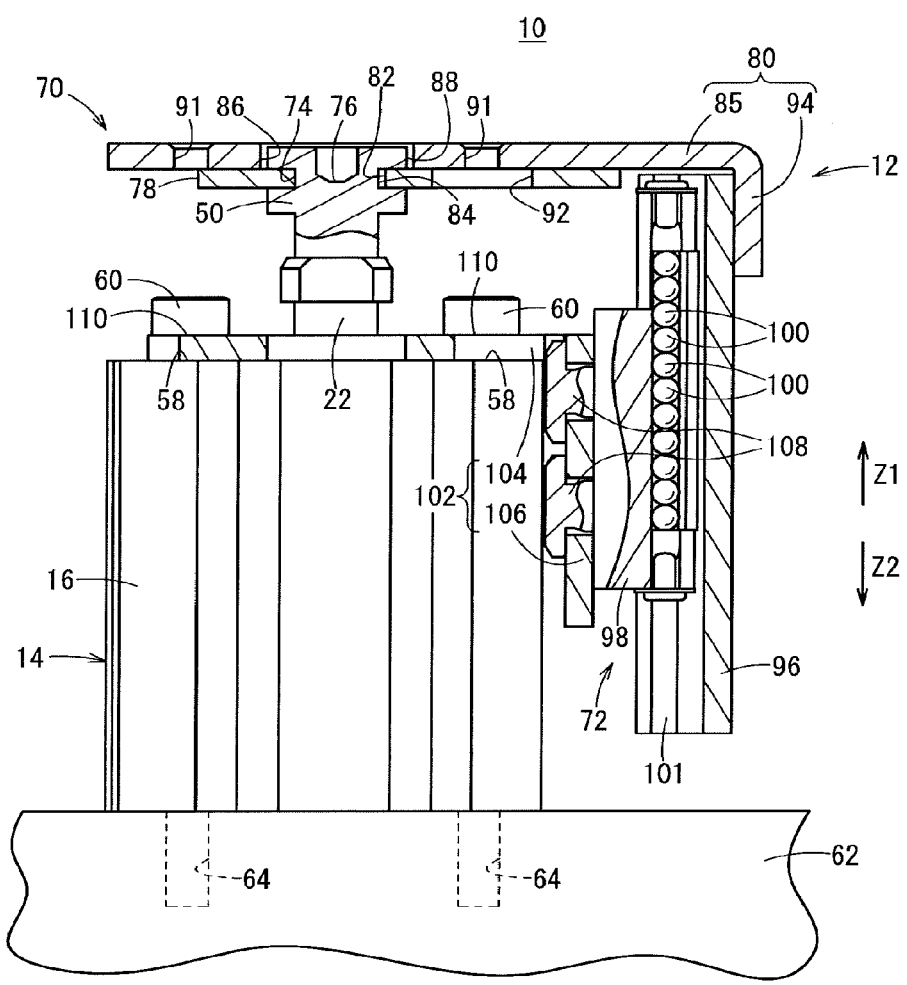
FIG. 7 is an overall schematic side view at a time that a piston rod, a floating bush, a holding part, and guide grooves (guide member) of the guide mechanism equipped cylinder arrive at a top dead center position.

Ultimately, the piston rod 22, the floating bush 50, the holding part 70, and the guide member 96 arrive at their top dead center positions as shown in FIG. 7. As a result, the workpiece is transported by the stroke amount of the floating bush 50 and the piston rod 22.

Since the guide member 96 rises upwardly in a straight line (in the direction of the arrow Z1) in FIG. 3, the floating bush 50, which is supported on the guide member 96 through the holding part 70, also rises upwardly in a straight line without experiencing any inclination. Therefore, the piston rod 22 and the piston 20 also rise upwardly in a straight line. Consequently, looseness or rattling due to inclination of the piston rod 22 and the piston 20 is avoided.

In addition, because the tube 16 is protected by the guide member 96, etc., even if the aforementioned lateral loads act on the guide mechanism equipped cylinder 10, it is unlikely for such lateral loads to be transmitted to the piston rod 22 and the floating bush 50. Coupled therewith, looseness or rattling is more effectively avoided.

Further, since the holding part 70 is joined to the guide member 96, it is also unlikely for rotation of the floating bush 50, which is retained by the holding part 70, as well as rotation of the piston rod 22 to occur. Therefore, non-rotational precision also is enhanced.

When the piston rod 22 and the floating bush 50 disposed on their top dead center positions return to their bottom dead center positions, a working fluid (e.g., air) is supplied to the second chamber 52 from the second port 56 (see FIG. 5). The piston 20 receives a pressing force of the working fluid that is supplied to the second chamber 52 and descends. At this time, the working fluid accommodated in the first chamber 32 is discharged out from the first port 54.

In following relation with the downward descent of the piston 20, the piston rod 22 and the floating bush 50 descend together therewith. More specifically, the holding part 70 and the guide member 96 both descend. At this time, since the balls 100 are circulated inside the guide grooves 101, the slider 98 is kept in its original position. Consequently, the slider 98 rises relatively with respect to the guide member 96.

In the foregoing manner, when the working fluid is supplied to the interior of the tube 16 and advancing and retracting operations of the piston rod 22 take place, the floating bush 50 and the guide member 96 also undergo advancing and retracting operations in the same directions in following relation therewith. At this time, while maintaining the same position, the slider 98 of the linear guide 72 is displaced relatively with respect to the guide member 96.

Ultimately, the piston rod 22, the floating bush 50, the holding part 70, and the guide member 96 return to the positions shown in FIG. 3 and arrive at their bottom dead center positions. When the floating bush 50 and the piston rod 22 return from the top dead center positions to their bottom dead center positions, another workpiece that differs from the aforementioned workpiece may be transported.

Also, when having returned from the top dead center to the bottom dead center positions, since the guide member 96 descends in a straight line downwardly (in the direction of the arrow Z2) in FIG. 7, the floating bush 50, the piston rod 22, and the piston 20 also descend in a straight line. Consequently, in this case as well, looseness or rattling due to inclination of the piston rod 22 and the piston 20 is avoided. As a matter of course, non-rotational precision also is enhanced.

Although according to the first embodiment, the lower end surface of the ceiling wall portion 104 of the L-shaped bracket 102 is placed in abutment against the upper end surface of the tube 16, and the L-shaped bracket 102 and the tube 16 are connected together by the tie rods 60, the flat section may also be placed in abutment against a lower end surface of the tube 16. Such a configuration will be described as a second embodiment. Constituent elements, which are the same as those shown in FIGS. 1 through 7, are basically given the same reference numerals, and detailed description of such features is omitted.

Figure 8:
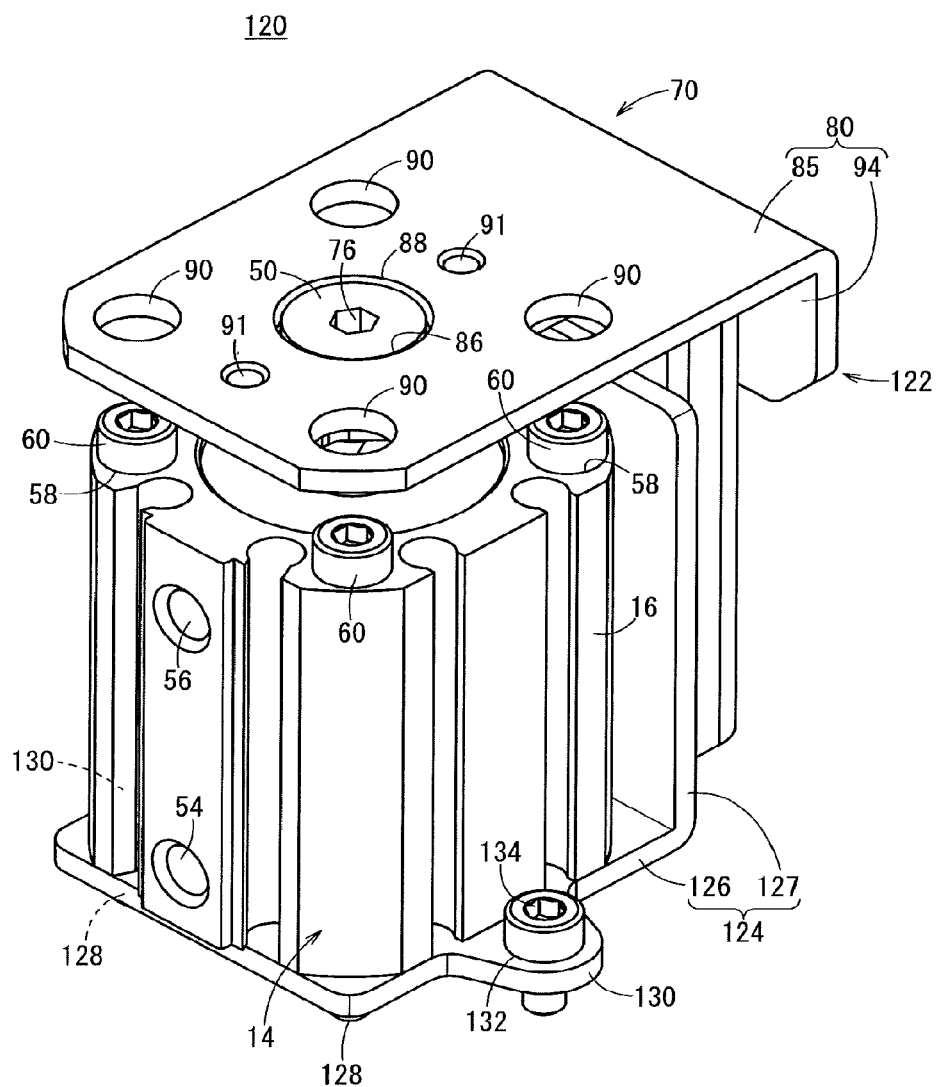
FIG. 8 is an overall schematic perspective view of the guide mechanism equipped cylinder according to a second embodiment.
Figure 9:
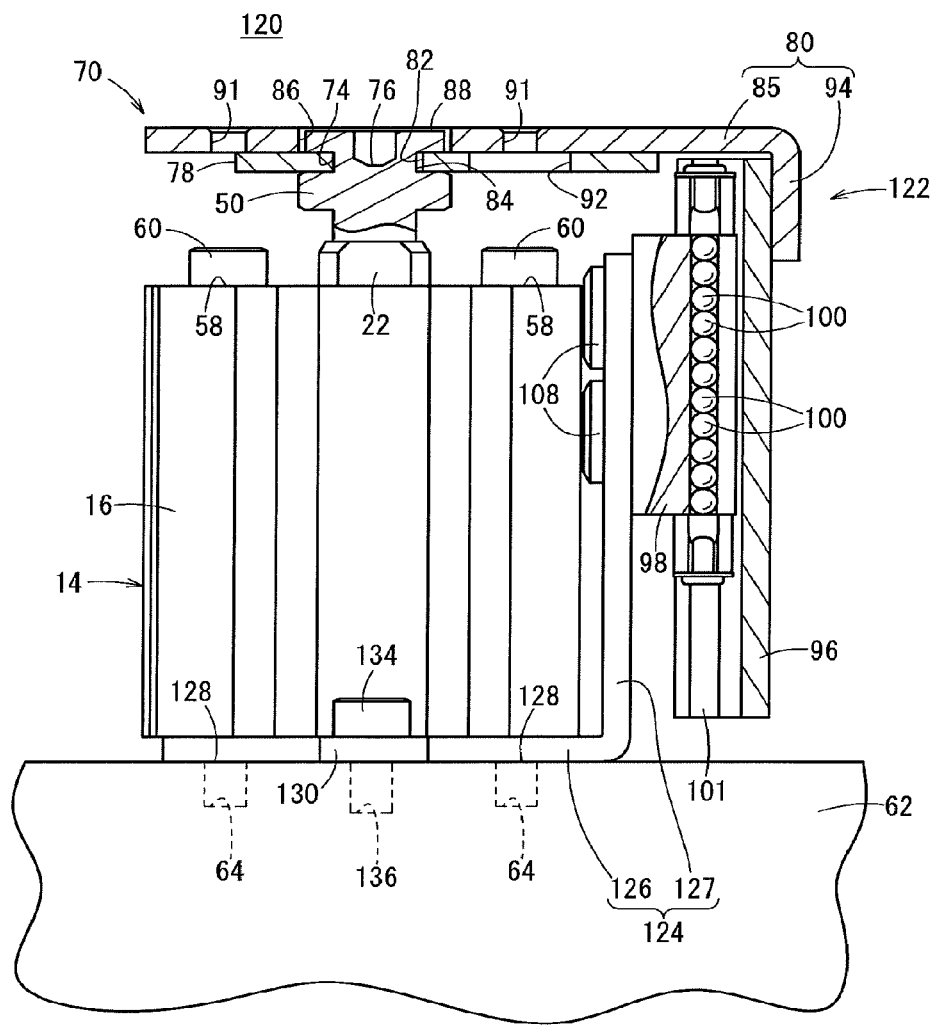
FIG. 9 is an overall schematic side view of the guide mechanism equipped cylinder according to the second embodiment.

FIG. 8 is an overall schematic perspective view of a guide mechanism equipped cylinder 120 according to a second embodiment, and FIG. 9 is an overall schematic side view thereof. In a guide mechanism 122 that makes up the guide mechanism equipped cylinder 120, an L-shaped bracket 124 includes a bottom wall portion 126 (flat section), and a vertical wall portion 127 (flat section) that is erected upwardly in a substantially vertical direction from the bottom wall portion 126. Among these elements, the vertical wall portion 127 is attached through bolts 108 to the slider 98, in the same manner as the downwardly hanging wall portion 106 of the L-shaped bracket 102 in the guide mechanism equipped cylinder 10 according to the first embodiment.

In the bottom wall portion 126, four tie rod insertion holes 128 are formed to penetrate therethrough in the thickness direction (vertical direction). Further, in the bottom wall portion 126, two tabs 130 are formed that project out at positions with left/right lateral symmetry. Bolt insertion holes 132 are formed to penetrate through the respective tabs 130.

In this case, in the attachment member 62, apart from the threaded holes 64 with which the tie rods 60 are screw-engaged, other threaded holes 136 are formed therein for screw-engagement of bolts 134. The bottom wall portion 126, which is wrapped around the lower end surface of the tube 16, is positioned and fixed in an interposed state between the attachment member 62 and the tube 16, by screw-engagement of the tie rods 60 into the threaded holes 64, and by screw-engagement of threaded portions of the bolts 134, which have been passed through the bolt insertion holes 132, into the threaded holes 136.

Moreover, according to the second embodiment, the guide mechanism 122 is attached to the cylinder 14 by the threaded portions of the tie rods 60, which have passed through the tie rod passage holes 90 of the L-shaped plate 80, being further passed through the tie rod insertion holes 58 of the tube 16 and the tie rod insertion holes 128 of the L-shaped bracket 124, and thereafter, by screw-engagement thereof into the threaded holes 64. Further, by screw-engagement of the tie rods 60 and the bolts 134, the guide mechanism equipped cylinder 120 is attached to the attachment member 62.

The diameters of the head portions of the tie rods 60 are larger than the diameters of the tie rod insertion holes 58 of the tube 16. Therefore, the tie rods 60 are blocked by the tube 16.

In the case that any kind of maintenance is to be performed with respect to the cylinder 14, if it becomes necessary to remove the cylinder 14, a driver or a wrench, etc., may be inserted from the tie rod passage holes 90 of the L-shaped plate 80, and the tie rods 60 may be loosened by screw-rotation thereof. The tie rods 60 may be pulled out by being passed through the tie rod passage holes 90, and the tie rods 60 may remain inserted through the tie rod insertion holes 58 of the tube 16.

Furthermore, a driver or wrench or the like is inserted into the screwing hole 76 of the floating bush 50, and the floating bush 50 is loosened from the piston rod 22 by screw-rotating the floating bush 50. In the foregoing manner, the cylinder 14 is released from the restraint of the guide mechanism 122.

Thereafter, the cylinder 14 is taken out from between the bottom wall portion 126 of the L-shaped bracket 124 and the ceiling wall portion 85 of the L-shaped plate 80, whereupon the cylinder 14 becomes exposed to the exterior of the guide mechanism 122. In other words, the cylinder 14 is taken out from the guide mechanism 122.

Thereafter, maintenance or the like is carried out with respect to the cylinder 14, and assuming that the tie rods 60 are inserted between the bottom wall portion 126 of the L-shaped bracket 124 and the ceiling wall portion 85 of the L-shaped plate 80, and then screw-engaged in the threaded holes 64, the cylinder 14 can be reattached to the guide mechanism 122. Moreover, during the time that maintenance is carried out, another prepared cylinder 14 may be attached to the guide mechanism 122, and transportation of workpieces may be performed thereby.

During the time that the cylinder 14 is removed and then reattached as described above, the guide mechanism 122 remains attached to the attachment member 62 by the bolts 134, which have positioned and fixed the L-shaped bracket 124 by screw-engagement thereof in the threaded holes 136 of the attachment member 62. Stated otherwise, when the cylinder 14 is removed from the guide mechanism 122, as well as when it is reattached to the guide mechanism 122, there is no particular need to remove the guide mechanism 122 from the attachment member 62. Therefore, both the removal operation and the reattachment operation are easily carried out.

The operations and other advantageous effects of the guide mechanism equipped cylinder 120 according to the second embodiment are the same as those of the guide mechanism equipped cylinder 10 according to the first embodiment, and therefore, detailed description of such features is omitted.

Furthermore, by using two L-shaped brackets, one of the L-shaped brackets may be made to abut against the lower end surface of the tube 16, whereas the remaining one of the L-shaped brackets may be made to abut against the upper end surface of the tube 16. Such a configuration will be described as a third embodiment. Constituent elements, which are the same as those shown in FIGS. 1 through 9, are basically given the same reference numerals, and detailed description of such features is omitted.

Figure 10:
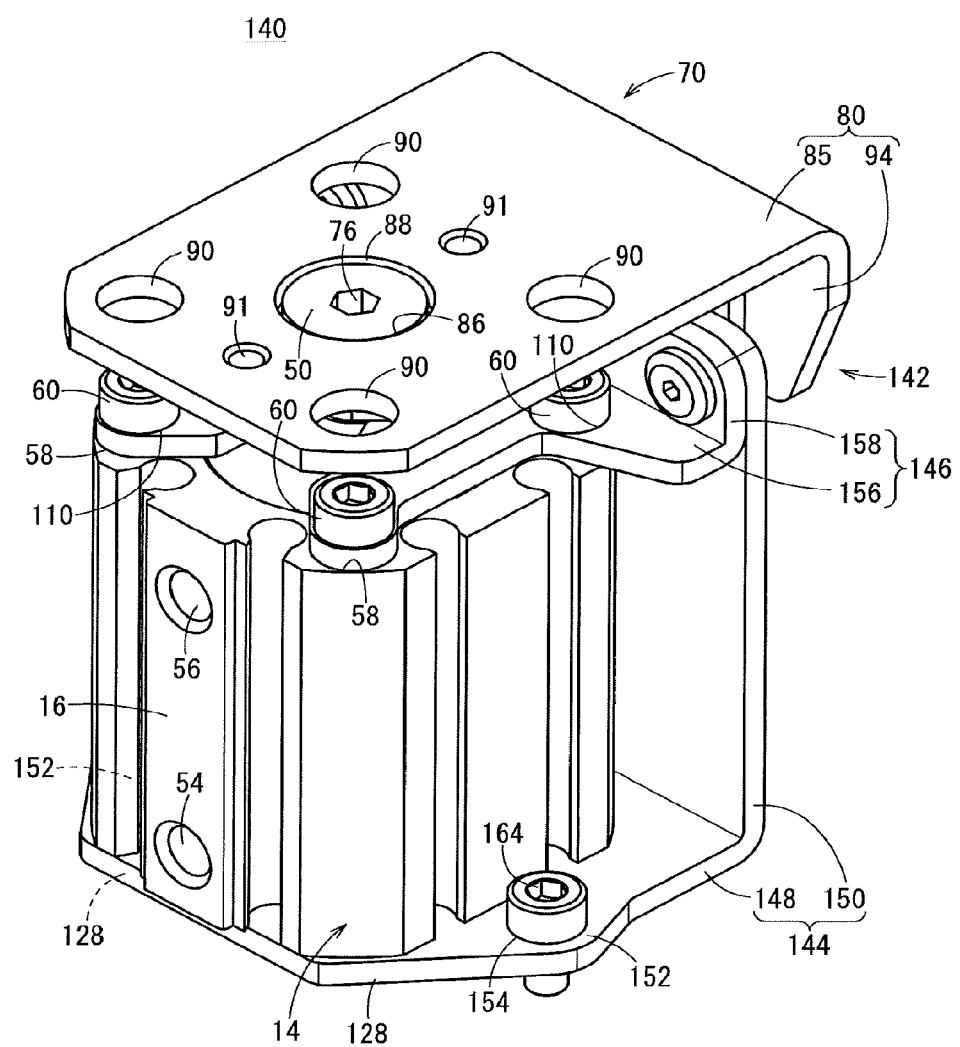
FIG. 10 is an overall schematic perspective view of the guide mechanism equipped cylinder according to a third embodiment.
Figure 11:
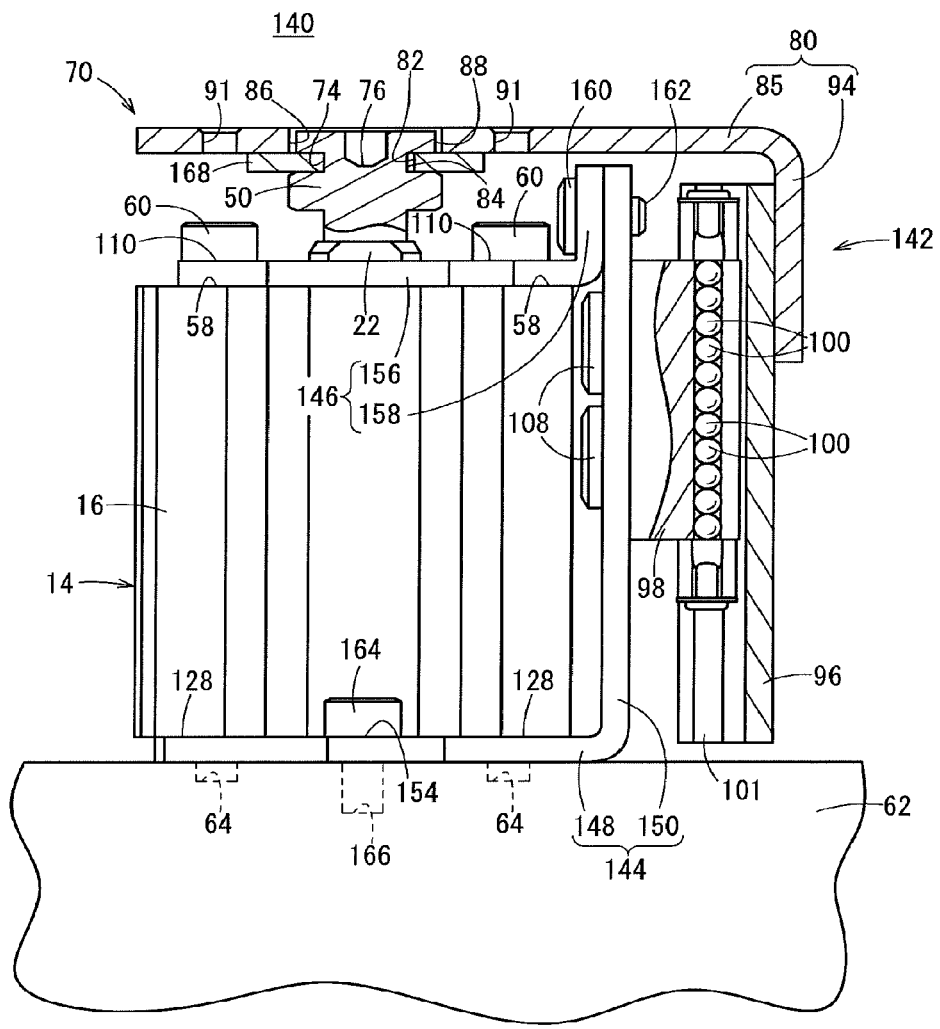
FIG. 11 is an overall schematic side view of the guide mechanism equipped cylinder according to the third embodiment.

FIG. 10 is an overall schematic perspective view of a guide mechanism equipped cylinder 140 according to a third embodiment, and FIG. 11 is an overall schematic side view thereof. A guide mechanism 142 that makes up the guide mechanism equipped cylinder 140 includes a first L-shaped bracket 144 and a second L-shaped bracket 146.

The first L-shaped bracket 144 is formed substantially in the same way as the L-shaped bracket 124, and includes a first bottom wall portion 148 (flat section), and a first vertical wall portion 150 (flat section) that is long and erected upwardly in a substantially vertical direction from the first bottom wall portion 148. Among such features, in the first bottom wall portion 148, four tie rod insertion holes 128 are formed to penetrate therethrough in the thickness direction (vertical direction). Further, in the first bottom wall portion 148, two widened portions 152 are formed that project out at positions with left/right lateral symmetry. Bolt insertion holes 154 are formed to penetrate through the respective widened portions 152.

The other first vertical wall portion 150 is attached through bolts 108 to the slider 98. Further, the second L-shaped bracket 146 is positioned and fixed to the first vertical wall portion 150. More specifically, the second L-shaped bracket 146 includes a second bottom wall portion 156 (flat section), and a second vertical wall portion 158 (flat section) that is short and erected upwardly in a substantially vertical direction from the second bottom wall portion 156. Insertion holes are formed to penetrate therethrough, respectively, in the first vertical wall portion 150 and the second vertical wall portion 158, such that when the second vertical wall portion 158 abuts against the first vertical wall portion 150, the through holes overlap with each other. Bolts 160 are passed through the insertion holes, and furthermore, nuts 162 are screw-engaged with the bolts 160. Consequently, the first L-shaped bracket 144 and the second L-shaped bracket 146 are connected.

In the same manner as the ceiling wall portion 104 of the L-shaped bracket 102 in the first embodiment, the second bottom wall portion 156 covers the upper end surface of the tube 16. Four tie rod blocking holes 110 are formed in the second bottom wall portion 156.

According to the third embodiment, the threaded portions of the tie rods 60, which have passed through the tie rod passage holes 90 of the L-shaped plate 80, are further passed through the tie rod blocking holes 110 that are formed in the second bottom wall portion 156 of the second L-shaped bracket 146, the tie rod insertion holes 58 that are formed in the tube 16, and the tie rod insertion holes 128 that are formed in the first bottom wall portion 148 of the first L-shaped bracket 144, and thereafter, are screw-engaged into the threaded holes 64 that are formed in the attachment member 62. Consequently, the guide mechanism 142 is assembled onto the cylinder 14, together with the guide mechanism equipped cylinder 140 being attached with respect to the attachment member 62.

The diameters of the head portions of the tie rods 60 are larger than the diameters of the tie rod blocking holes 110. Therefore, the tie rods 60 are blocked by the second bottom wall portion 156 of the second L-shaped bracket 146.

In this instance, in the attachment member 62, threaded holes 166 are formed therein for screw-engagement of bolts 164 that have been passed through the bolt insertion holes 154 of the first bottom wall portion 148. The first bottom wall portion 148, which is wrapped around the lower end surface of the tube 16, is positioned and fixed in an interposed state between the attachment member 62 and the tube 16, by screw-engagement of the tie rods 60 into the threaded holes 64, and by screw-engagement of threaded portions of the bolts 164, which have been passed through the bolt insertion holes 154, into the threaded holes 166.

Further, according to the third embodiment, a retaining plate 168 that retains the floating bush 50 is made up from a small flat plate-shaped member having a U-shaped groove 82 formed therein.

In the case that any kind of maintenance is to be performed with respect to the cylinder 14, if it becomes necessary to remove the cylinder 14, a driver or a wrench, etc., may be inserted from the tie rod passage holes 90 of the L-shaped plate 80, and the tie rods 60 may be loosened by screw-rotation thereof. The tie rods 60 may be pulled out by being passed through the tie rod passage holes 90, and the tie rods 60 may remain inserted in the tie rod blocking holes 110 of the second L-shaped bracket 146.

Furthermore, a driver or wrench or the like is inserted into the screwing hole 76 of the floating bush 50, and the floating bush 50 is loosened from the piston rod 22 by screw-rotating the floating bush 50. In the foregoing manner, the cylinder 14 is released from the restraint of the guide mechanism 142.

Thereafter, the cylinder 14 is taken out from between the first bottom wall portion 148 of the first L-shaped bracket 144 and the second bottom wall portion 156 of the second L-shaped bracket 146, whereupon the cylinder 14 becomes exposed to the exterior of the guide mechanism 142. In other words, the cylinder 14 is taken out from the guide mechanism 142.

Thereafter, assuming that the cylinder 14, on which maintenance and the like has been carried out, is inserted between the first bottom wall portion 148 of the first L-shaped bracket 144 and the second bottom wall portion 156 of the second L-shaped bracket 146, and furthermore, the tie rods 60 are screw-engaged in the threaded holes 64, the cylinder 14 can be reattached to the guide mechanism 142. Moreover, during the time that maintenance is carried out, another prepared cylinder 14 may be attached to the guide mechanism 142, and transportation of workpieces may be performed thereby.

During the time that the cylinder 14 is removed and then reattached as described above, the guide mechanism 142 remains attached to the attachment member 62 by the bolts 164, which have positioned and fixed the first L-shaped bracket 144 by screw-engagement thereof in the threaded holes 166 of the attachment member 62. Stated otherwise, when the cylinder 14 is removed from the guide mechanism 142, as well as when it is reattached to the guide mechanism 142, there is no particular need to remove the guide mechanism 142 from the attachment member 62. Therefore, both the removal operation and the reattachment operation are easily carried out.

The operations and other advantageous effects of the guide mechanism equipped cylinder 140 according to the third embodiment are the same as those of the guide mechanism equipped cylinder 10 according to the first embodiment and the guide mechanism equipped cylinder 120 according to the second embodiment, and therefore, detailed description of such features is omitted.

In the connecting member passage holes, which are represented by the tie rod passage holes 90, there may further be included positioning members that are inserted therein and which serve to position the workpiece. Such a configuration will be described as a fourth embodiment. Constituent elements, which are the same as those shown in FIGS. 1 through 11, are basically given the same names, and detailed description of such features is omitted.

Figure 12:
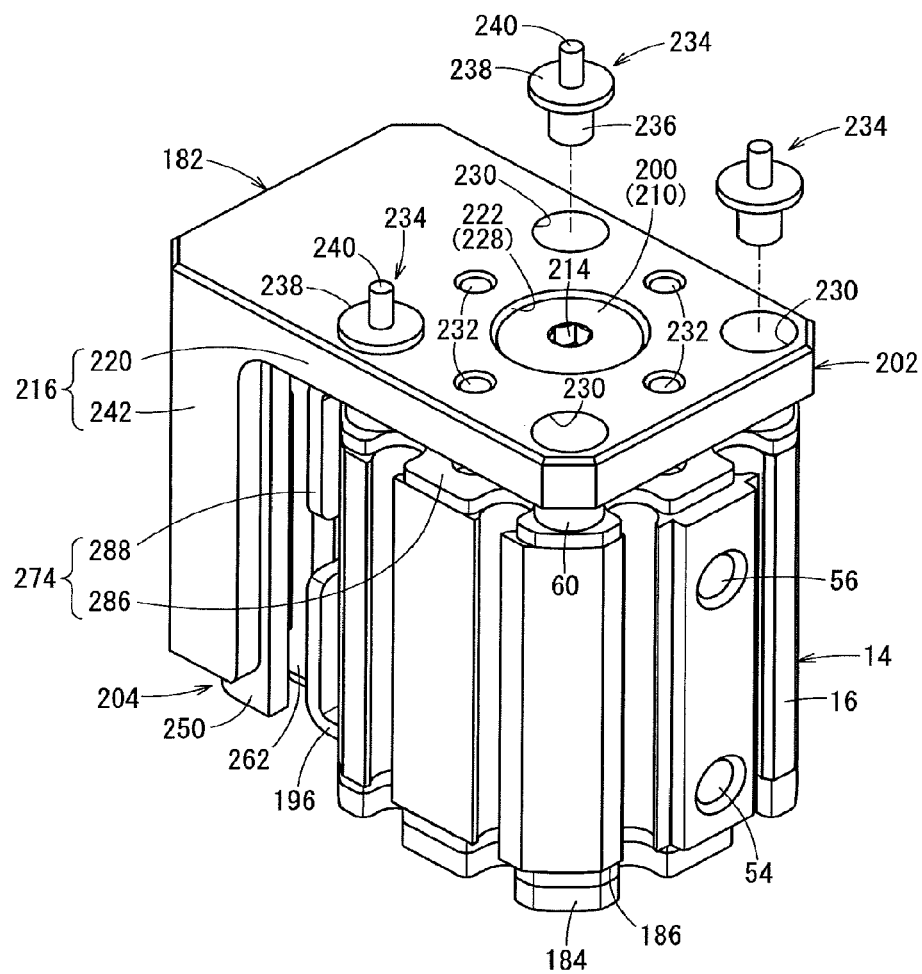
FIG. 12 is an overall schematic perspective view of the guide mechanism equipped cylinder according to a fourth embodiment.
Figure 13:
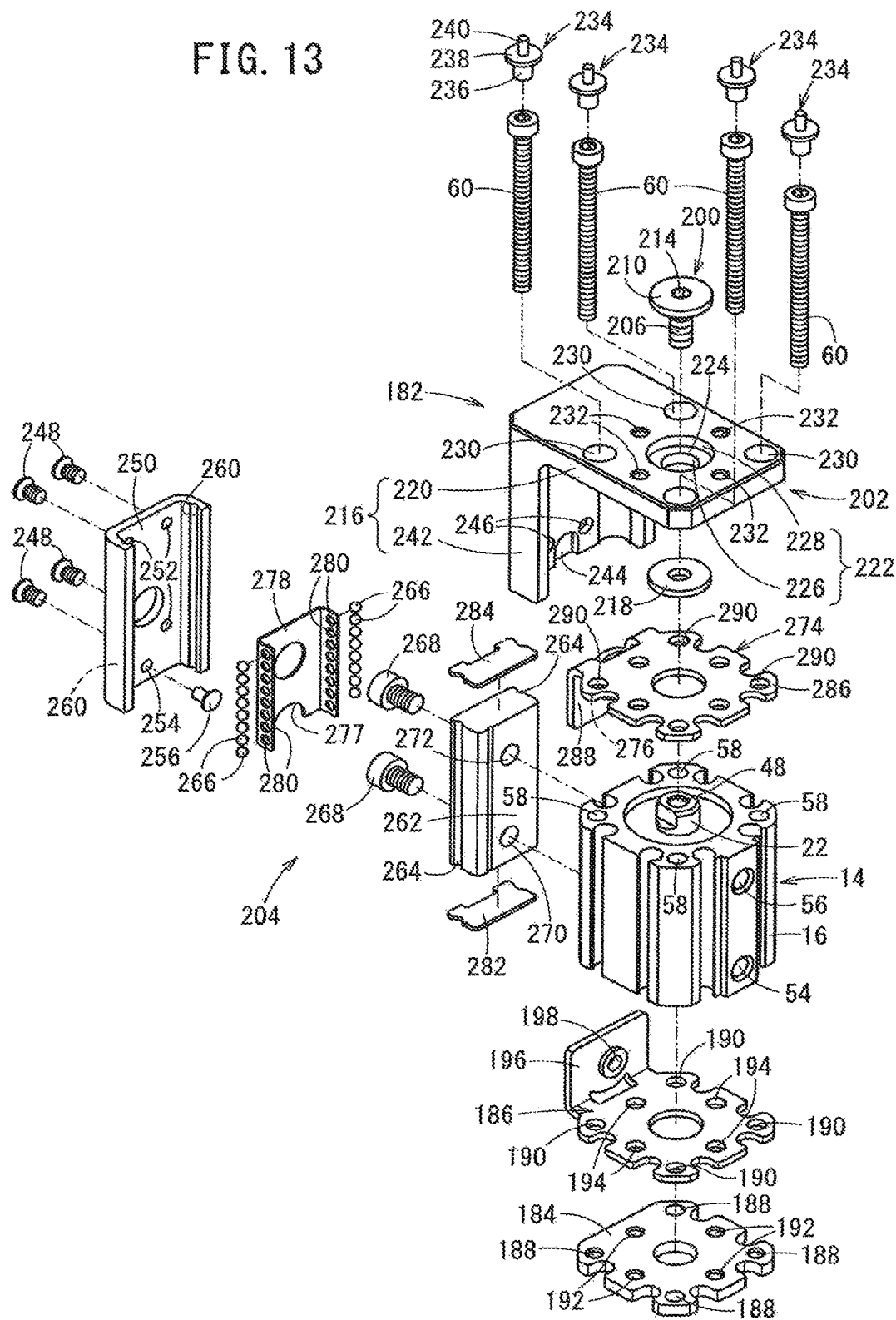
FIG. 13 is a schematic exploded perspective view of the guide mechanism equipped cylinder according to the fourth embodiment.
Figure 14:
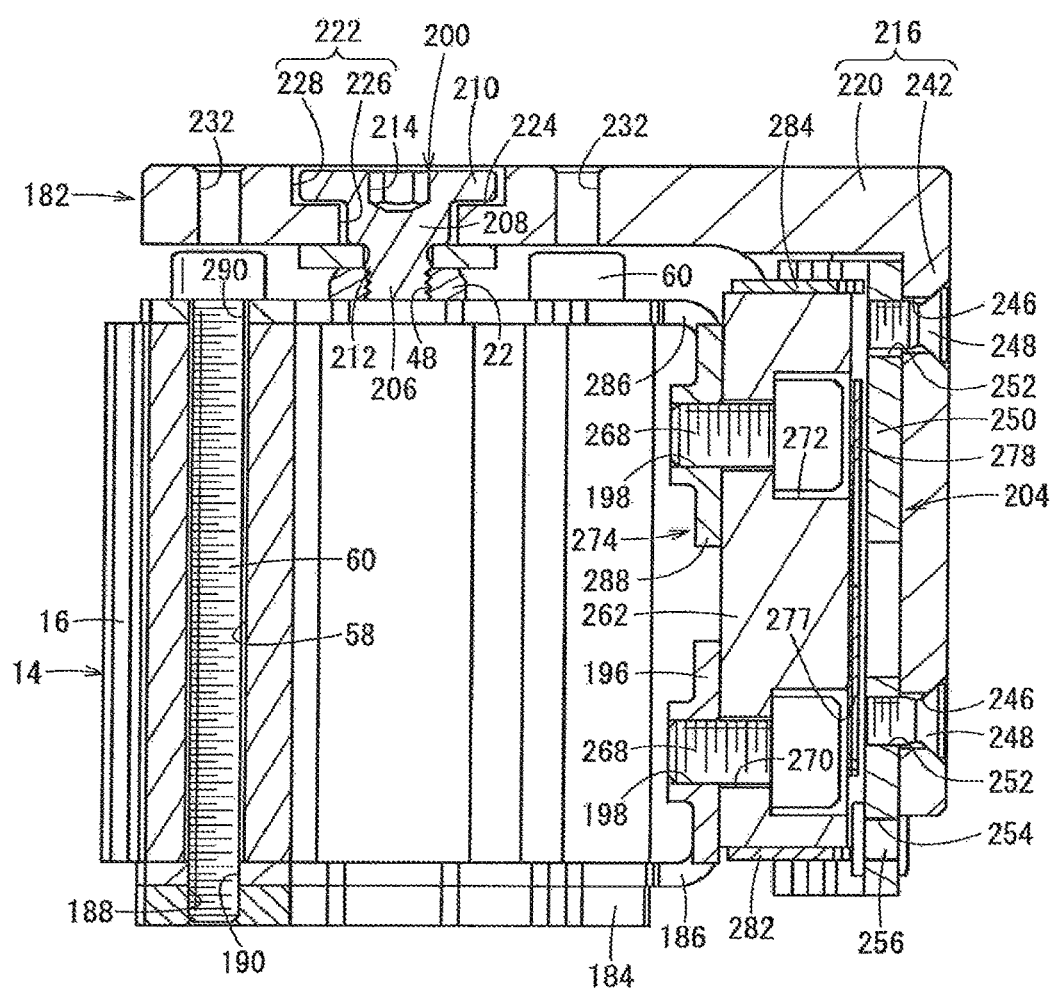
FIG. 14 is a schematic side cross-sectional view of the guide mechanism equipped cylinder according to the fourth embodiment.

FIGS. 12 through 14, respectively, are an overall schematic perspective view, a schematic exploded perspective view, and a schematic side cross-sectional view of a guide mechanism equipped cylinder 180 according to a fourth embodiment. The guide mechanism equipped cylinder 180 is constituted by attaching a guide mechanism 182 with respect to a cylinder 14.

In this case, a flat plate 184 and an L-shaped plate 186 are disposed on a lower end surface side of the tube 16. Tie rod threaded holes 188, which overlap with the tie rod insertion holes 58 of the tube 16, and first tie rod passage holes 190 are formed respectively in the flat plate 184 and the L-shaped plate 186. As will be discussed later, the tie rods 60, which are passed through the first tie rod passage holes 190, are screw-engaged in the tie rod threaded holes 188. Consequently, the tube 16 is connected to the flat plate 184, and the L-shaped plate 186 is sandwiched and gripped between the tube 16 and the flat plate 184. More specifically, according to the fourth embodiment, the flat plate 184 becomes the "predetermined member".

Through holes 192, 194 are formed respectively between each of the adjacent tie rod threaded holes 188, 188, and between each of the first tie rod passage holes 190, 190. The tie rod threaded holes 188 and the through holes 192 penetrate in the thickness direction through the flat plate 184, and the first tie rod passage holes 190 and the through holes 194 penetrate in the thickness direction through the L-shaped plate 186. The positions of the tie rod threaded holes 188 correspond with the positions of the first tie rod passage holes 190, and the positions of the through holes 192 correspond with the through holes 194.

Furthermore, a bolt receiving hole 198 with screw threads engraved therein is formed in a vertical wall portion 196 of the L-shaped plate 186.

On the other hand, the guide mechanism 182 comprises a floating bush 200, a holding part 202 that retains the floating bush 200, and a linear guide 204 (guide mechanism) that guides the floating bush 200 through the holding part 202.

The floating bush 200 includes a shaft portion 206, a blocking portion 208, and a head portion 210, which become greater in diameter in this order. The shaft section 206 is inserted into the connecting hole 48 that is formed in the upper end part of the piston rod 22, together with a threaded portion formed on the side wall thereof being screw-engaged with the screw threads that are formed inside the connecting hole 48.

On the shaft portion 206, on an upper portion thereof in the vicinity of the blocking portion 208, an annular projection 212 is formed to project outwardly in a diametral direction. The annular projection 212 is smaller in diameter than the blocking portion 208. Furthermore, a bottomed screwing hole 214 for insertion therein of a driver or wrench or the like is formed in a recessed manner on the upper end surface of the head portion 210 that is connected to an upper side of the blocking portion 208.

In the fourth embodiment, the holding part 202 includes an L-shaped arm member 216 (workpiece transporting member) for transporting workpieces, and a retaining ring 218 (retaining member) for retaining the floating bush 200 on the L-shaped arm member 216. Among such features, in the retaining ring 218, the shaft portion 206 of the floating bush 200 is passed therethrough. The inner diameter of the retaining ring 218 is set to be substantially equivalent to the maximum diameter of the annular projection 212. On the other hand, the thickness of the retaining ring 218 is greater than the thickness of the annular projection 212. Consequently, the annular projection 212 comes into abutment only against a portion of the inner wall of the retaining ring 218. Stated otherwise, a large portion of the inner wall of the retaining ring 218 remains at a distance with respect to the shaft portion 206.

On a flat ceiling wall portion 220 of the L-shaped arm member 216, a bush insertion hole 222 is formed in a penetrating manner in the thickness direction. An annular stepped portion 224 is formed inside the bush insertion hole 222, and therefore, the bush insertion hole 222 is made up from a small diameter hole 226 and a large diameter hole 228. The small diameter hole 226 is larger in diameter than the shaft portion 206 and the blocking portion 208, yet is smaller in diameter than the head portion 210. Further, the large diameter hole 228 is larger in diameter than the head portion 210.

The shaft portion 206 and the blocking portion 208 of the floating bush 200 are passed through the small diameter hole 226, and furthermore, as noted above, the shaft portion 206 is screw-engaged into the connecting hole 48. Owing to such screw-engagement, the retaining ring 218 is sandwiched between the top surface of the piston rod 22 and the bottom end surface of the blocking portion 208. As a result, the floating bush 200 is prevented from being pulled out from the bush insertion hole 222. More specifically, the floating bush 200 is retained on the L-shaped arm member 216 by the retaining ring 218.

The side wall of the blocking portion 208 is distanced from the inner wall of the small diameter hole 226. Further, the head portion 210 of the floating bush 200 is distanced from both the inner wall of the large diameter hole 228 and the annular stepped portion 224. More specifically, a predetermined amount of play is formed between the floating bush 200 and the L-shaped arm member 216.

Therefore, the floating bush 200 is not constricted by the L-shaped arm member 216. Ultimately, in this case as well, a floating supported state is provided, in which the floating bush 200 is capable of relative displacement inside the bush insertion hole 222 within the range of play provided.

Moreover, the upper end surface of the head portion 210 is placed in a state of being accommodated inside the bush insertion hole 222. In other words, the upper end surface of the head portion 210 is positioned lower than the upper end surface of the L-shaped arm member 216.

Furthermore, four second tie rod passage holes 230 (connecting member passage holes) through which the tie rods 60 are passed, and four workpiece supporting holes 232 are formed in a penetrating manner along the thickness direction in the ceiling wall portion 220. The four second tie rod passage holes 230 are positioned at locations corresponding to the vertices of a square, and are formed in facing relation to the tie rod insertion holes 58 that are formed in the tube 16. On the other hand, the workpiece supporting holes 232 are formed in closer proximity to the bush insertion hole 222 than the second tie rod passage holes 230, and at positions between each of the adjacent second tie rod passage holes 230, 230.

Stepped pins 234 (positioning members) are inserted into the second tie rod passage holes 230. More specifically, each of the stepped pins 234 is constituted by connecting in a straight line manner a fixing insert part 236 having a cylindrical or columnar shape, a large diameter stopper member 238 that is larger in diameter than the second tie rod passage holes 230, and a positioning insert part 240 for positioning the workpiece. The fixing insert parts 236 are inserted into the second tie rod passage holes 230, and the exposed positioning insert parts 240 are inserted into predetermined positioning holes that are formed in the workpiece.

On the other hand, the workpiece supporting holes 232 serve as members for attaching the workpiece to the L-shaped arm member 216. More specifically, for example, in the event that threaded screw-engagement holes are formed in the workpiece, bolts may be inserted through the workpiece supporting holes 232 from the lower end surface side of the ceiling wall portion 220 of the L-shaped arm member 216, and may be screw-engaged with the threaded screw-engagement holes. Otherwise, in the same manner as the second tie rod passage holes 230, the stepped pins may be inserted, and the workpiece may be supported by the stepped pins.

A bottomed cutout 244, which is shaped in the form of a bisected elongated hole, is formed in a downwardly hanging wall portion 242 that is bent and hangs down from the ceiling wall portion 220 of the L-shaped arm member 216. Further, screw holes 246 are formed in the downwardly hanging wall portion 242, and through screws 248 that are screw-engaged in the screw holes 246, a guide member 250, which constitutes the linear guide 204 as a guide mechanism, is connected to the downwardly hanging wall portion 242. By means of this connection, the guide member 250 is retained on the L-shaped arm member 216. The guide member 250 is arranged so that the bottomed cutout 244 remains exposed.

Screw insertion holes 252 through which the screws 248 are passed, and a rivet hole 254 are formed in the guide member 250. A shaft portion of a rivet 256 that has passed through the rivet hole 254 is crushed, whereby the rivet 256 is prevented from being pulled out from the rivet hole 254. The crushed shaft portion enters into the bottomed cutout 244.

As noted above, the floating bush 200 is retained in the L-shaped arm member 216 through the retaining ring 218. Therefore, the floating bush 200 also is supported indirectly by the guide member 250.

In this case, guide grooves 260 are formed in the guide member 250, together with ball grooves 264 being formed in a slider 262 as a member that is displaced. The slider 262 is displaced relatively with respect to the guide member 250, as a result of plural balls 266 undergoing sliding movement inside the guide grooves 260 and the ball grooves 264.

Bolt accommodating holes 270, 272 for passage therethrough of connecting bolts 268 are formed in the slider 262. The connecting bolt 268 that has passed through the bolt accommodating hole 270 is screw-engaged in the bolt receiving hole 198 of the L-shaped plate 186. On the other hand, the connecting bolt 268 that has passed through the bolt accommodating hole 272 is screw-engaged in a bolt receiving hole 276 of an L-shaped bracket 274 (to be described later). Consequently, the L-shaped plate 186 and the L-shaped bracket 274 are connected to the slider 262.

Further, a semicircular cutout 277 for the purpose of avoiding interference with the rivet 256 is formed in the slider 262.

A ball cover 278 having side end surfaces bent at substantially 90° is placed in covering relation with respect to the slider 262. Plural retaining windows 280 are formed in the side end surfaces. The guide grooves 260 and the ball grooves 264 undergo sliding movement in a state in which the respective balls 266 are inserted into the retaining windows 280.

A lower stopper member 282 and an upper stopper member 284 are welded, for example, to a lower end surface and an upper end surface of the slider 262. Displacement of the ball cover 278 is regulated by means of the lower stopper member 282 and the upper stopper member 284.

The slider 262 and the tube 16 are connected via the L-shaped bracket 274. More specifically, the L-shaped bracket 274 includes a ceiling wall portion 286 (flat section), and a downwardly hanging wall portion 288 (flat section) that hangs down from the ceiling wall portion 286. An intersecting angle of the ceiling wall portion 286 and the downwardly hanging wall portion 288 form an angle of roughly 90°.

The downwardly hanging wall portion 288 is attached to (supported on) the slider 262 by screw engagement of the connecting bolts 268 into the bolt receiving holes 276 in the manner described above. On the other hand, four tie rod blocking holes 290 are formed in the ceiling wall portion 286, and the tube 16 is attached to (supported on) the ceiling wall portion 286 by the tie rods 60, the heads of which are blocked in the respective tie rod blocking holes 290.

The guide mechanism equipped cylinder 180 according to the fourth embodiment is constructed basically as described above. Next, operations and advantageous effects thereof will be described.

During attachment of the guide mechanism 182 with respect to the cylinder 14, by using the connecting bolts 268, the slider 262 is connected to the tube through the L-shaped plate 186 and the L-shaped bracket 274. The screw-turned connecting bolts 268 are accommodated entirely in the interiors of the bolt accommodating holes 270, 272. Furthermore, the slider 262 is covered by the ball cover 278 with the balls 266 retained in the retaining windows 280 thereof, together with the ball cover 278 being covered by the guide member 250. At this time, the balls 266 inside the retaining windows 280 are inserted into the ball grooves 264 and the guide grooves 260. In addition, the lower stopper member 282 and the upper stopper member 284 are joined with respect to the slider 262.

Before or after these actions, the shaft portion of the rivet 256, which is inserted beforehand in the rivet hole 254 and is exposed on the rear surface (an end surface facing toward the downwardly hanging wall portion 242) of the guide member 250, is crushed or collapsed. In addition, the screws 248, which are passed through the screw insertion holes 252, are screw-engaged with the screw holes 246. In the foregoing manner, the linear guide 204 is retained on the L-shaped arm member 216. The crushed shaft portion of the rivet 256 enters into the bottomed cutout 244 of the L-shaped arm member 216.

Next, the shaft portion 206 of the floating bush 200 is passed through the small diameter hole 226 of the bush insertion hole 222 and the retaining ring 218, and is inserted into the connecting hole 48 of the piston rod 22. Thereafter, the floating bush 200 is rotated through a driver or wrench or the like, which is inserted into the screwing hole 214 of the floating bush 200. Accordingly, the threaded section of the floating bush 200 is screw-engaged with the screw threads of the connecting hole 48.

At this time, the retaining ring 218 is sandwiched between the top surface of the piston rod 22 and the bottom end surface of the blocking portion 208 of the floating bush 200. Along therewith, as a result of the retaining ring 218 supporting the floating bush 200, the floating bush 200 is prevented from being pulled out from the bush insertion hole 222. More specifically, the floating bush 200 is retained on the L-shaped arm member 216 through the retaining ring 218.

Next, the lower end surface of the tube is placed in abutment at a predetermined location of the L-shaped plate 186 above the flat plate 184. At this time, the positions of the tie rod insertion holes 58 of the tube 16 are aligned with the positions of the first tie rod passage holes 190 and the tie rod threaded holes 188. More specifically, the first tie rod passage holes 190 and the tie rod insertion holes 58 are made contiguous with the tie rod threaded holes 188.

In this state, the L-shaped bracket 274 is arranged so that the tie rod blocking holes 290 overlap with the tie rod insertion holes 58. Furthermore, threaded sections of the tie rods 60 are passed through the second tie rod passage holes 230 of the L-shaped arm member 216, the tie rod blocking holes 290, and the tie rod insertion holes 58, and are screw-engaged in the tie rod threaded holes 188. The diameters of the head portions of the tie rods 60 are smaller than the diameters of the second tie rod passage holes 230, and therefore, the tie rods 60 are easily allowed to pass through the second tie rod passage holes 230.

Further, because the diameters of the head portions of the tie rods 60 are larger than the diameters of the tie rod blocking holes 290, the head portions of the tie rods 60 are blocked at positions in the vicinity of the openings of the tie rod blocking holes 290. Accordingly, the tie rods 60 connect the L-shaped bracket 274 to the tube 16, together with connecting the tube 16 to the flat plate 184 and the L-shaped plate 186. In accordance with the above, the guide mechanism 182 is attached to the cylinder 14 to thereby constitute the guide mechanism equipped cylinder 180.

In this manner, in the fourth embodiment as well, production of a so-called retrofitted device, in which the guide mechanism 182 is attached with respect to a preexisting cylinder 14, is facilitated. For attaching the guide mechanism equipped cylinder 180 to another member, for example, stepped pins may also be used. More specifically, ends of the stepped pins may be inserted into the through holes 192, 194, whereas other ends thereof may be inserted into positioning holes of another predetermined member.

According to the fourth embodiment, a side wall of the blocking portion 208 of the floating bush 200 is distanced from the inner wall of the small diameter hole 226, and the head portion 210 thereof is distanced from both the inner wall of the large diameter hole 228 and the annular stepped portion 224. More specifically, a predetermined amount of play is formed between the floating bush 200 and the L-shaped arm member 216. Consequently, within the range of the amount of play, the floating bush 200 can be displaced relatively with respect to the holding part 202.

Therefore, at the time that center axial misalignment takes place between the floating bush 200 and the piston rod 22, while the floating bush 200 is maintained in a state of being held by the retaining ring 218 and hence by the holding part 202, the floating bush 200 is capable of being connected to the piston rod 22 in such a manner that the central axis thereof coincides with the central axis of the piston rod 22.

Furthermore, the fixing insert parts 236 of the stepped pins 234 are inserted with respect to the second tie rod passage holes 230. The stepped pins 234 are positioned by the stopper members 238 thereof abutting against the ceiling wall portion 220, and the positioning insert parts 240 thereof are exposed in an outwardly projecting manner.

The positioning insert parts 240 are inserted into positioning holes of the workpiece. Owing thereto, the workpiece can be positioned.

Furthermore, a workpiece, not shown, is retained by the L-shaped arm member 216 through bolts or stepped pins or the like that are passed through the workpiece supporting holes 232. Consequently, the workpiece is supported on the guide mechanism equipped cylinder 180.

The guide mechanism equipped cylinder 180 is operated in the same manner as the guide mechanism equipped cylinder 10. More specifically, when the piston rod 22 and the floating bush 200 are at their bottom dead center positions, a working fluid (e.g., air) is supplied to the first chamber 32 from the first port 54 shown in FIG. 5. The piston 20 receives a pressing force of the working fluid that is supplied to the first chamber 32. As a result, the piston 20 and the piston rod 22 rise upwardly. At this time, the working fluid accommodated in the second chamber 52 is discharged out from the second port 56.

Accompanying the rise of the piston rod 22, the floating bush 200 also rises. Since the floating bush 200 is held on the retaining ring 218, and the L-shaped arm member 216 that holds the retaining ring 218 also is retained by the guide member 250 as well, the holding part 202 and the guide member 250 rise in following relation with rising of the floating bush 200. At this time, since the balls 266 undergo sliding movement, the slider 262 is kept in its original position. Consequently, the slider 262 descends relatively with respect to the guide member 250.

Figure 15:
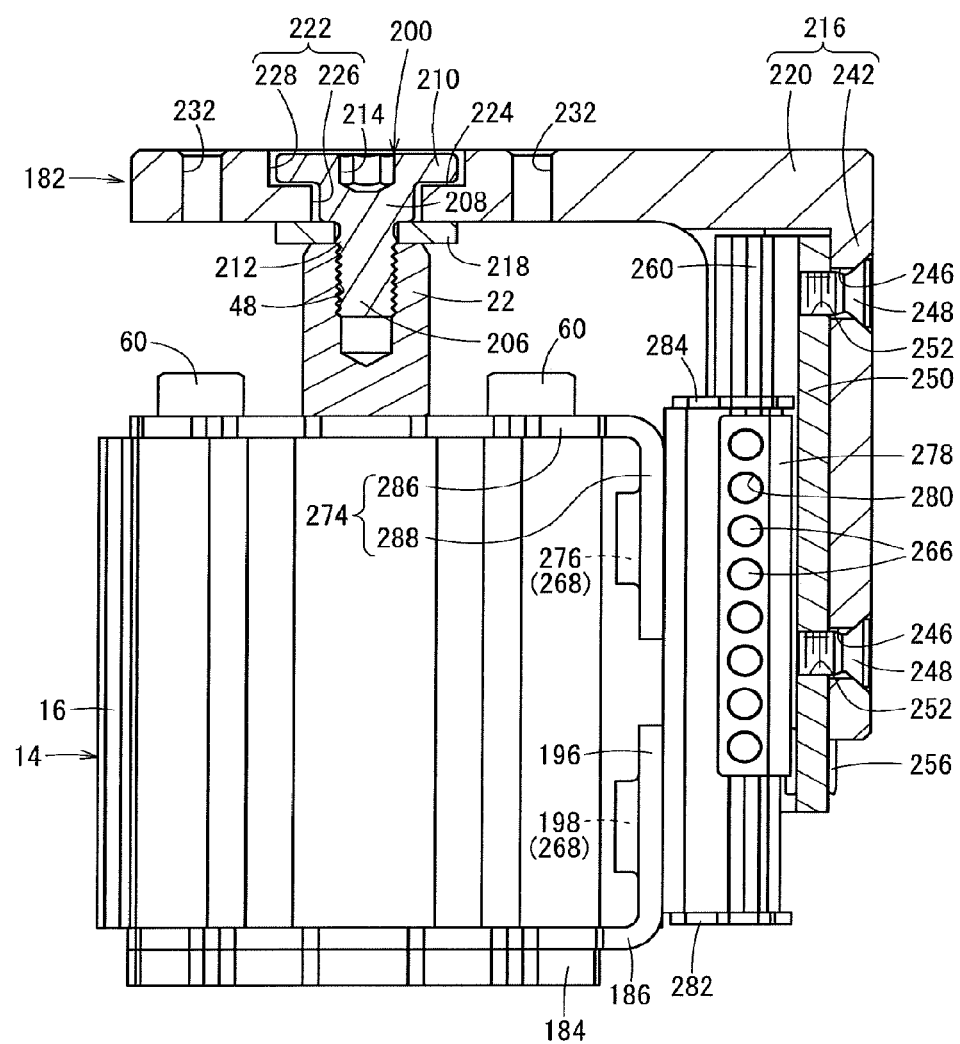
FIG. 15 is a schematic side cross-sectional view at a time that a holding part is displaced in the guide mechanism equipped cylinder according to the fourth embodiment.

When the guide member 250 abuts against the upper stopper member 284, further upward displacement of the guide member 250 is restricted. More specifically, the piston rod 22, the floating bush 200, the holding part 202, and the guide member 250 arrive at their top dead center positions as shown in FIG. 15. Consequently, the workpiece is transported by the stroke amount of the floating bush 200 and the piston rod 22.

When the top dead center positioned piston rod 22 and the floating bush 200 return to their bottom dead center positions, a working fluid (e.g., air) is supplied to the second chamber 52 from the second port 56 (see FIG. 5). The piston 20 receives a pressing force of the working fluid that is supplied to the second chamber 52 and descends. At this time, the working fluid accommodated in the first chamber 32 is discharged out from the first port 54.

In following relation with the downward descent of the piston 20, the piston rod 22 and the floating bush 200 descend together therewith. Along therewith, the holding part 202 and the guide member 250 both descend. At this time, since the balls 266 undergo sliding movement, the slider 262 is kept in its original position. Consequently, the slider 262 rises relatively with respect to the guide member 250.

In addition, the guide member 250 comes into abutment against the lower stopper member 282, and together therewith, the ceiling wall portion, which is bent in the bottomed cutout 244 of the L-shaped arm member 216, abuts against the collapsed shaft portion of the rivet 256. Consequently, further upward displacement of the guide member 250 is restricted. More specifically, the piston rod 22, the floating bush 200, the holding part 202, and the guide member 250 arrive at their bottom dead center positions as shown in FIG. 14. When the floating bush 200 and the piston rod 22 return from the top dead center positions to their bottom dead center positions, another workpiece that differs from the aforementioned workpiece may be transported.

When the above actions are performed, for the same reasons discussed in relation to the first embodiment, non-rotational precision also is enhanced. Stated otherwise, in the fourth embodiment as well, the same advantages and effects of the first through third embodiments are obtained.

Figure 16:
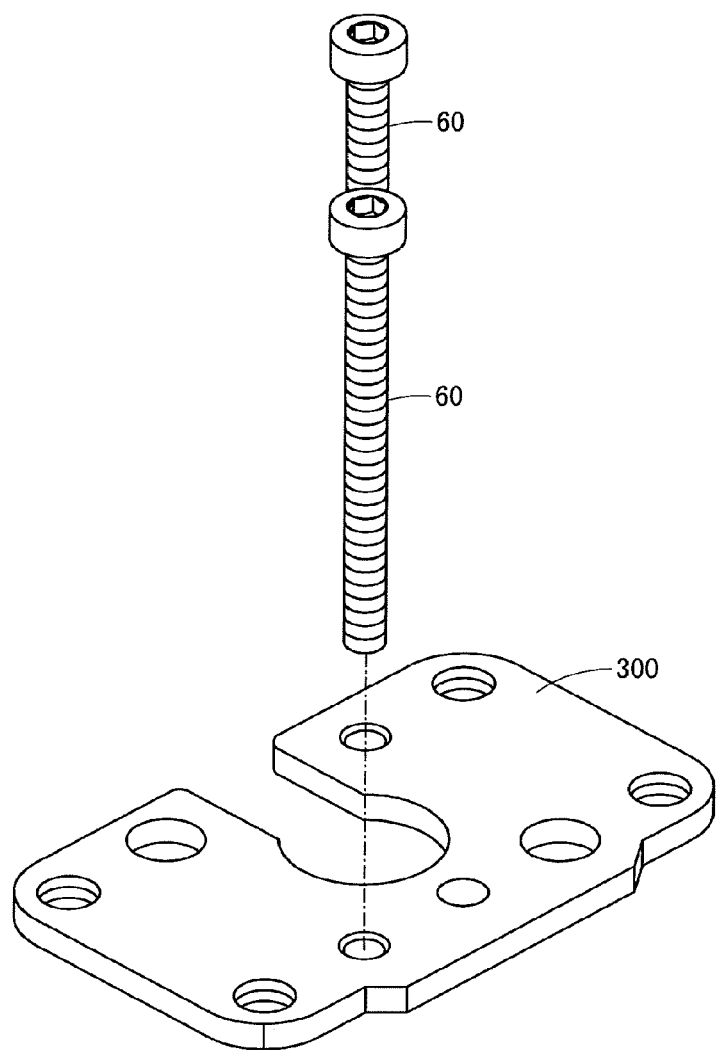
FIG. 16 is a schematic perspective view of a flange member that is capable of being assembled onto the guide mechanism equipped cylinder according to the fourth embodiment.
Figure 17:
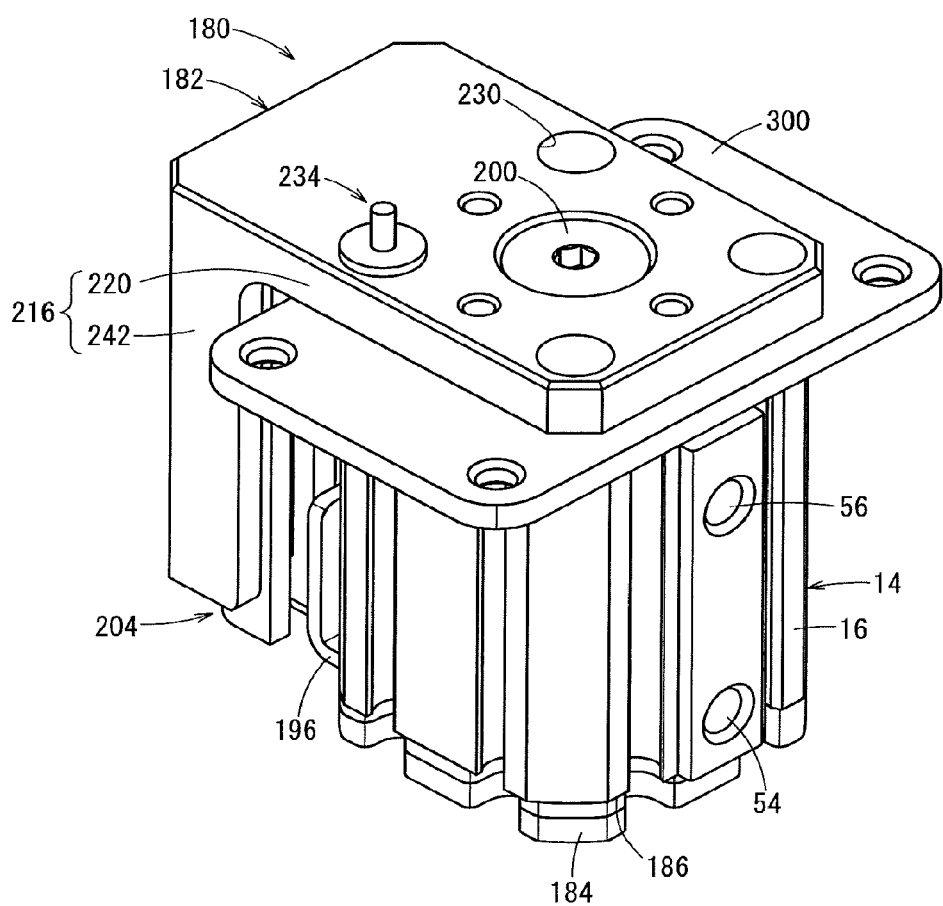
FIG. 17 is an overall schematic side view showing a modified example in which a flange member is disposed on the guide mechanism equipped cylinder according to the fourth embodiment.
Figure 18:
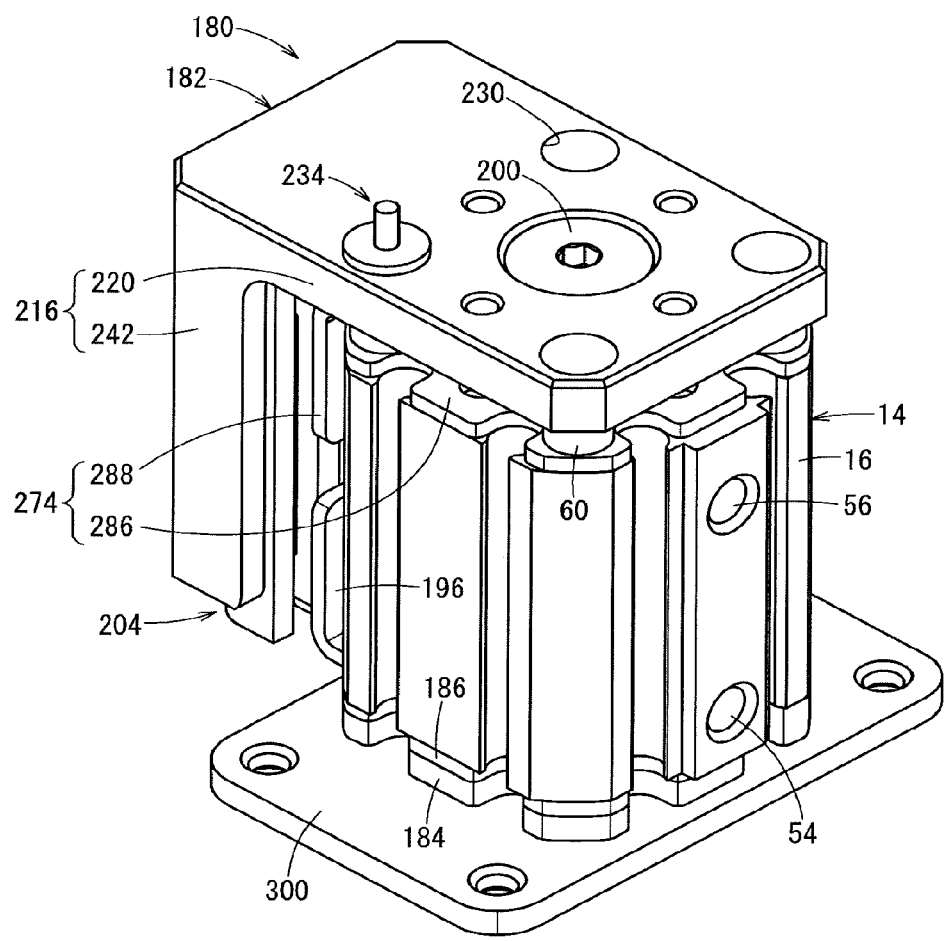
FIG. 18 is an overall schematic side view showing a modified example in which the flange member is disposed at a different position from that shown in FIG. 17.

A flange member 300 shown in FIG. 16 may also be assembled onto the guide mechanism equipped cylinder 180. As shown in FIG. 17, the flange member 300 may be interposed between the L-shaped bracket 274 and the L-shaped arm member 216, and may be disposed so that the tie rods 60 pass therethrough. Further, as shown in FIG. 18, the flange member 300 may be used in place of the flat plate 184. In this case, the guide mechanism equipped cylinder 180 can be attached via the flange member 300 to a workpiece or another predetermined member. Consequently, the attachment operation is further facilitated.

Moreover, without using the flat plate 184 or the flange member 300, in the same manner as with the first embodiment, the tie rods 60 may be screw-engaged in the predetermined attachment member 62 (see FIG. 3).

Further, instead of the stepped pins 234, the shank portions of bolts or the like may be inserted into the second tie rod passage holes 230, and a workpiece may be positioned by means of such bolts.

The present invention is not limited to the first through fourth embodiments described above, and various modifications may be adopted therein without departing from the essential scope of the present invention.

For example, in any of the first through fourth embodiments, the guide mechanisms 12, 122, 142, 182 are attached to the cylinder 14 in such a manner that the guide member 96 is positioned on a rear surface side of the first port 54 and the second port 56, or stated otherwise, so that there is a phase difference of 180° between both ports 54, 56 and the guide member 96. However, the guide member 96 may be disposed so as to face toward both ports 54, 56 (with a phase difference of 0°), or the guide member 96 may be disposed with a phase difference of 90° between the guide member 96 and both ports 54, 56.

As can be appreciated from this feature, the guide mechanisms 12, 122, 142, 182 can be attached to the cylinder 14 in any arbitrary direction. Stated otherwise, the degree of freedom in attaching the guide mechanisms 12, 122, 142, 182 is high. Therefore, it is possible for the guide mechanisms 12, 122, 142, 182 to be arranged at positions that do not interfere with a predetermined location of the attachment member 62.

Further, for convenience and to facilitate understanding, the piston rod 22 was shown as being arranged on the upper side exposed from the tube 16, whereas the side opposite therefrom was shown as being arranged on the lower side. However, during actual use of the guide mechanism equipped cylinders 10, 120, 140, 180, there is no particular need for the directions in which the piston rod 22 and the floating bush 50, 200 extend to coincide with the vertical direction. For example, the guide mechanism equipped cylinders 10, 120, 140, 180 may be put to actual use at postures in which the piston rod 22 and the floating bush 50, 200 extend in a horizontal direction.

More specifically, the upward and downward directions in the above description do not necessarily imply a vertical direction during actual use, and when in actual use, the upward and downward directions may coincide with a horizontal direction, or the guide mechanism equipped cylinders 10, 120, 140, 180 may be inclined with respect to the vertical direction and the horizontal direction. Naturally, the guide mechanism equipped cylinders 10, 120, 140, 180 may be put to use at postures in which the upward and downward directions in the above description coincide respectively with a vertical upward direction and a vertical downward direction, or conversely, the guide mechanism equipped cylinders 10, 120, 140, 180 may be put to use at postures in which the upward and downward directions in the above description coincide respectively with a vertical downward direction and a vertical upward direction.

The invention claimed is:

1. A cylinder guide mechanism attached to a cylinder in which a piston rod performs relative advancing and retracting operations with respect to a tube, comprising:
    a floating bush configured to undergo advancing and retracting operations in following relation to the advancing and retracting operations of the piston rod;
    a holding part configured to retain the floating bush;
    a guide mechanism including a guide member retained by the holding part, and a displaceable member supported on the guide member by a guide including at least one rolling element guided to be displaced in a linear path with respect to the guide member; and
    a bracket attached to the tube by at least one fastener and configured to connect the displaceable member and the tube,
    wherein:
    the holding part comprises a connecting member passage hole for passage therethrough of a connecting member to connect the tube to a predetermined member,
    the tube comprises a connecting member insertion hole for insertion therethrough of the connecting member, and
    the connecting member passage hole has a larger diameter than the connecting member and the connecting member insertion hole.

2. The cylinder guide mechanism according to claim 1, wherein:
    the holding part includes a workpiece transporting member configured to transport a workpiece, and a retaining member configured to retain the floating bush on the workpiece transporting member;
    a bush insertion hole in which the floating bush is inserted is formed in the workpiece transporting member; and
    an amount of play takes place between an inner wall of the bush insertion hole and a side wall of the floating bush.

3. The cylinder guide mechanism according to claim 2, wherein:
    a first engagement part is formed on the floating bush, and a second engagement part that engages with the first engagement part is formed on the retaining member; and
    an amount of play takes place between the first engagement part and the second engagement part.

4. The cylinder guide mechanism according to claim 3, wherein the first engagement part is a circumferential groove formed around the side wall of the floating bush, and the second engagement part is an insert portion that is inserted into the circumferential groove.

5. The cylinder guide mechanism according to claim 1, wherein the bracket is an elbow-shaped member in which two flat sections are joined via a bent section.

6. The cylinder guide mechanism according to claim 5, wherein one of the flat sections that makes up the bracket abuts against an end surface of the tube on which the piston rod is exposed, or abuts against a rear surface on an opposite side from the end surface, and a remaining one of the flat sections is connected to the displaceable member.

7. The cylinder guide mechanism according to claim 1, further including a positioning member inserted into the connecting member passage hole and configured to position a workpiece.

8. The cylinder guide mechanism according to claim 1, wherein a workpiece supporting hole is formed in the holding part and configured to support a workpiece.

9. A guide mechanism equipped cylinder including a cylinder in which a piston rod performs relative advancing and retracting operations with respect to a tube, and a cylinder guide mechanism attached to the cylinder, wherein the cylinder guide mechanism comprises:
    a floating bush configured to undergo advancing and retracting operations in following relation to the advancing and retracting operations of the piston rod;
    a holding part configured to retain the floating bush;
    a guide mechanism including a guide member retained by the holding part, and a displaceable member supported on the guide member by a guide including at least one rolling element guided to be displaced in a linear path with respect to the guide member; and
    a bracket attached to the tube by at least one fastener and connected to the displaceable member and the tube,
    wherein:
    the holding part comprises a connecting member passage hole for passage therethrough of a connecting member to connect the tube to a predetermined member,
    the tube comprises a connecting member insertion hole for insertion therethrough of the connecting member, and
    the connecting member passage hole has a larger diameter than the connecting member and the connecting member insertion hole.

10. The guide mechanism equipped cylinder according to claim 9, wherein:
    the holding part includes a workpiece transporting member configured to transport a workpiece, and a retaining member configured to retain the floating bush on the workpiece transporting member;
    a bush insertion hole in which the floating bush is inserted is formed in the workpiece transporting member; and
    an amount of play takes place between an inner wall of the bush insertion hole and a side wall of the floating bush.

11. The guide mechanism equipped cylinder according to claim 10, wherein:
    a first engagement part is formed on the floating bush, and a second engagement part that engages with the first engagement part is formed on the retaining member; and
    an amount of play takes place between the first engagement part and the second engagement part.

12. The guide mechanism equipped cylinder according to claim 11, wherein the first engagement part is a circumferential groove formed around a side wall of the floating bush, and the second engagement part is an insert portion that is inserted into the circumferential groove.

13. The guide mechanism equipped cylinder according to claim 9, wherein the bracket is an elbow-shaped member in which two flat sections are joined via a bent section.

14. The guide mechanism equipped cylinder according to claim 13, wherein one of the flat sections that makes up the bracket abuts against an end surface of the tube on which the piston rod is exposed, or abuts against a rear surface on an opposite side from the end surface, and a remaining one of the flat sections is connected to the displaceable member.

15. The guide mechanism equipped cylinder according to claim 9, further including a positioning member inserted into the connecting member passage hole and configured to position a workpiece.

16. The guide mechanism equipped cylinder according to claim 9, wherein a workpiece supporting hole is formed in the holding part and configured to support a workpiece.

* * * * *